(12) United States Patent
Yip et al.

(10) Patent No.: US 11,133,681 B2
(45) Date of Patent: Sep. 28, 2021

(54) SYSTEM AND METHOD FOR TRACKING AND ARCHIVING BATTERY PERFORMANCE DATA

(71) Applicant: Zoll Circulation, Inc., San Jose, CA (US)

(72) Inventors: Sean Yip, Mountain View, CA (US); David Mack, Saratoga, CA (US)

(73) Assignee: ZOLL Circulation, Inc., San Jose, CA (US)

( * ) Notice: Subject to any disclaimer, the term of this patent is extended or adjusted under 35 U.S.C. 154(b) by 0 days.

(21) Appl. No.: 16/676,305

(22) Filed: Nov. 6, 2019

(65) Prior Publication Data

US 2020/0280196 A1  Sep. 3, 2020

Related U.S. Application Data

(63) Continuation of application No. 14/949,649, filed on Nov. 23, 2015, now Pat. No. 10,476,278, which is a continuation of application No. 13/458,996, filed on Apr. 27, 2012, now Pat. No. 9,197,079.

(60) Provisional application No. 61/522,204, filed on Aug. 10, 2011, provisional application No. 61/480,286, filed on Apr. 28, 2011.

(51) Int. Cl.
*H02J 7/00* (2006.01)
*A61H 31/00* (2006.01)

(52) U.S. Cl.
CPC .......... *H02J 7/0014* (2013.01); *A61H 31/004* (2013.01); *H02J 7/00* (2013.01); *H02J 7/0021* (2013.01); *H02J 7/0024* (2013.01); *H02J 7/0026* (2013.01); *H02J 7/00036* (2020.01); *H02J 7/0045* (2013.01); *H02J 7/00045* (2020.01); *H02J 7/00034* (2020.01); *H02J 7/00038* (2020.01); *H02J 7/0047* (2013.01)

(58) Field of Classification Search
CPC .......... H02J 7/00036; H02J 7/00; H02J 50/80; H02J 7/00045; H02J 7/007; H02J 7/0013; H02J 7/0047; H02J 7/00034; H02J 7/0026; H02J 7/0014; H01M 10/4257; H04L 67/1097; G06F 15/17331
See application file for complete search history.

(56) References Cited

U.S. PATENT DOCUMENTS

| 4,455,523 | A | 6/1984 | Koenck |
| 4,709,202 | A | 11/1987 | Koenck et al. |
| 4,792,743 | A | 12/1988 | Tsujino et al. |
| 4,845,419 | A | 7/1989 | Hacker |
| 5,325,041 | A | 6/1994 | Briggs |

(Continued)

FOREIGN PATENT DOCUMENTS

| AU | 2007202105 A1 * | 11/2007 | ........... A61H 31/004 |
| CN | 101106281 | 1/2008 | |

(Continued)

*Primary Examiner* — Helen Rossoshek
(74) *Attorney, Agent, or Firm* — Gardella Grace P.A.

(57) ABSTRACT

An intelligent rechargeable battery pack having a battery management system for monitoring and controlling the charging and discharging of the battery pack is described. The battery management system includes a memory for storing data related to the operation of the battery, and the battery management system is also configured to communicate the data related to the operation of the battery to other processors for analysis.

7 Claims, 10 Drawing Sheets

(56) References Cited

U.S. PATENT DOCUMENTS

| | | |
|---|---|---|
| 5,514,946 A | 5/1996 | Lin et al. |
| 5,534,765 A | 7/1996 | Kreisinger et al. |
| 5,539,298 A | 7/1996 | Perkins et al. |
| 5,606,242 A * | 2/1997 | Hull .................... H02J 7/00047 320/106 |
| 5,625,291 A * | 4/1997 | Brink .................. H02J 7/00036 324/427 |
| 5,652,502 A | 7/1997 | van Phuoc et al. |
| 5,656,914 A * | 8/1997 | Nagele ................ H02J 7/0042 320/110 |
| 5,701,068 A | 12/1997 | Baer et al. |
| 5,796,239 A * | 8/1998 | van Phuoc ............ H02J 7/0003 320/107 |
| 5,926,545 A | 7/1999 | Wu |
| 5,932,989 A * | 8/1999 | Thandiwe ......... H01M 10/4257 320/106 |
| 6,012,153 A * | 1/2000 | Brink .................. A61N 1/3975 714/47.1 |
| 6,064,804 A | 5/2000 | Brink et al. |
| 6,169,387 B1 | 1/2001 | Kaib |
| 6,181,103 B1 | 1/2001 | Chen |
| 6,307,349 B1 | 10/2001 | Koenck et al. |
| 6,577,104 B2 | 6/2003 | Sakakibara |
| 6,730,432 B1 | 5/2004 | Grosfeld et al. |
| 6,741,065 B1 | 5/2004 | Ishii et al. |
| 7,041,206 B2 | 5/2006 | Gephart et al. |
| 7,045,989 B2 * | 5/2006 | Sakakibara ........... H02J 7/0021 320/106 |
| 7,059,769 B1 * | 6/2006 | Potega .................. B60L 58/12 374/185 |
| 7,110,896 B2 | 9/2006 | Lamer |
| 7,728,548 B2 | 6/2010 | Daynes et al. |
| 8,346,312 B2 * | 1/2013 | Brown ................ H04L 63/0869 455/572 |
| 8,493,022 B2 | 7/2013 | Bertness |
| 8,836,284 B2 | 9/2014 | Takahashi |
| 8,922,163 B2 * | 12/2014 | Macdonald ............. A47F 10/00 320/109 |
| 9,437,848 B2 | 9/2016 | Pendry |
| 9,461,486 B2 | 10/2016 | Rozenboim |
| 9,700,310 B2 | 7/2017 | Morgan et al. |
| 9,871,234 B2 | 1/2018 | Pendry |
| 10,862,323 B2 | 12/2020 | Banos |
| 2007/0244471 A1 | 10/2007 | Malackowski |
| 2009/0295326 A1 | 12/2009 | Daynes et al. |
| 2011/0029157 A1 | 2/2011 | Muzaffer |
| 2012/0101755 A1 | 4/2012 | Hirasawa |
| 2012/0112691 A1 | 5/2012 | Kurs et al. |
| 2014/0266222 A1 | 9/2014 | Baughman |
| 2014/0312848 A1 | 10/2014 | Alexander et al. |
| 2020/0244073 A1 | 7/2020 | Yip |
| 2020/0287399 A9 * | 9/2020 | Banos .................. H01M 10/44 |

FOREIGN PATENT DOCUMENTS

| | | |
|---|---|---|
| EP | 0494505 | 7/1992 |
| EP | 1987990 | 11/2008 |
| WO | 2006/082425 | 8/2006 |
| WO | 2009/070663 | 6/2009 |
| WO | 2012149409 | 11/2012 |
| WO | 2012149482 | 11/2012 |

* cited by examiner

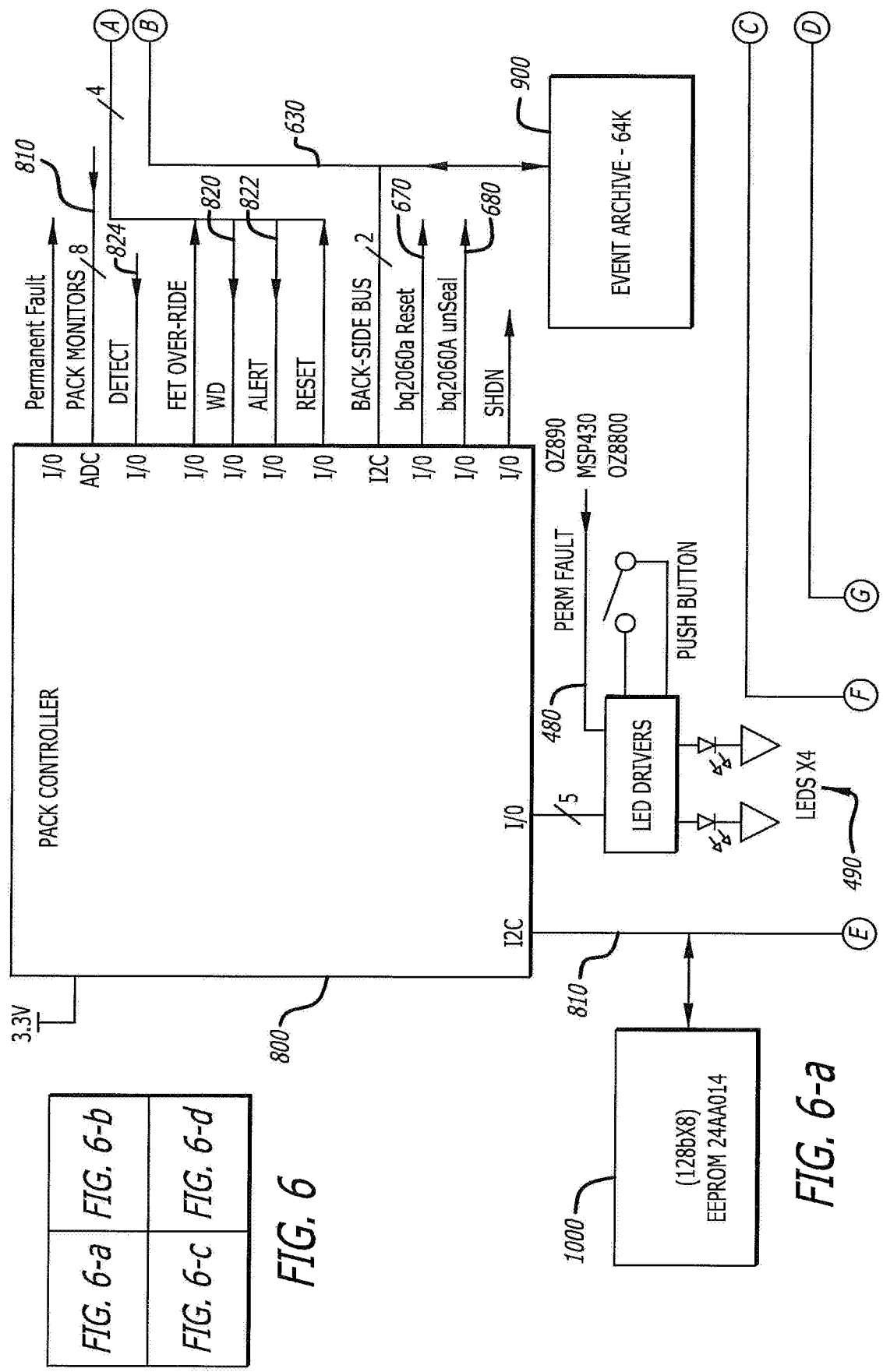

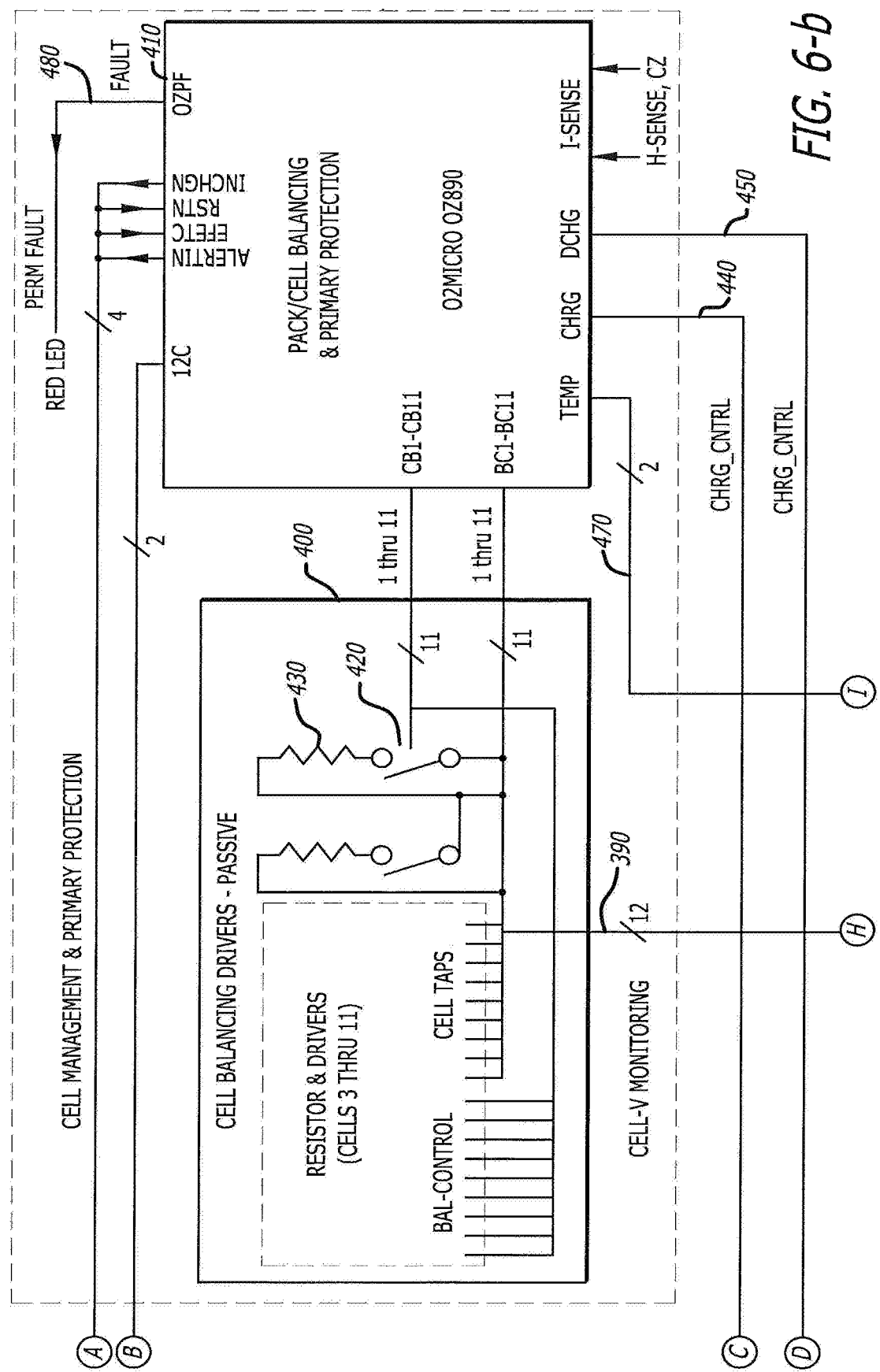
FIG. 6-b

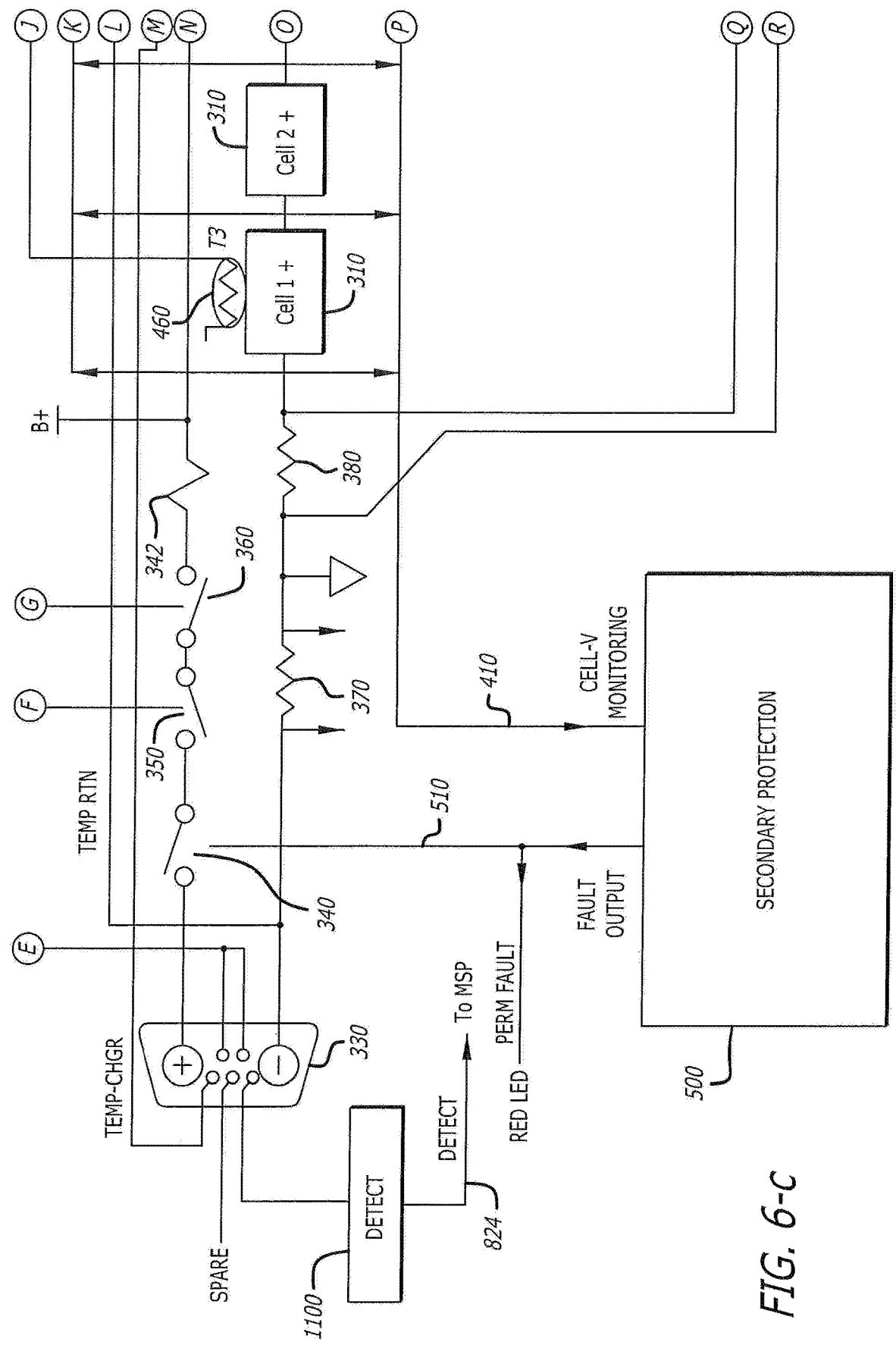
FIG. 6-C

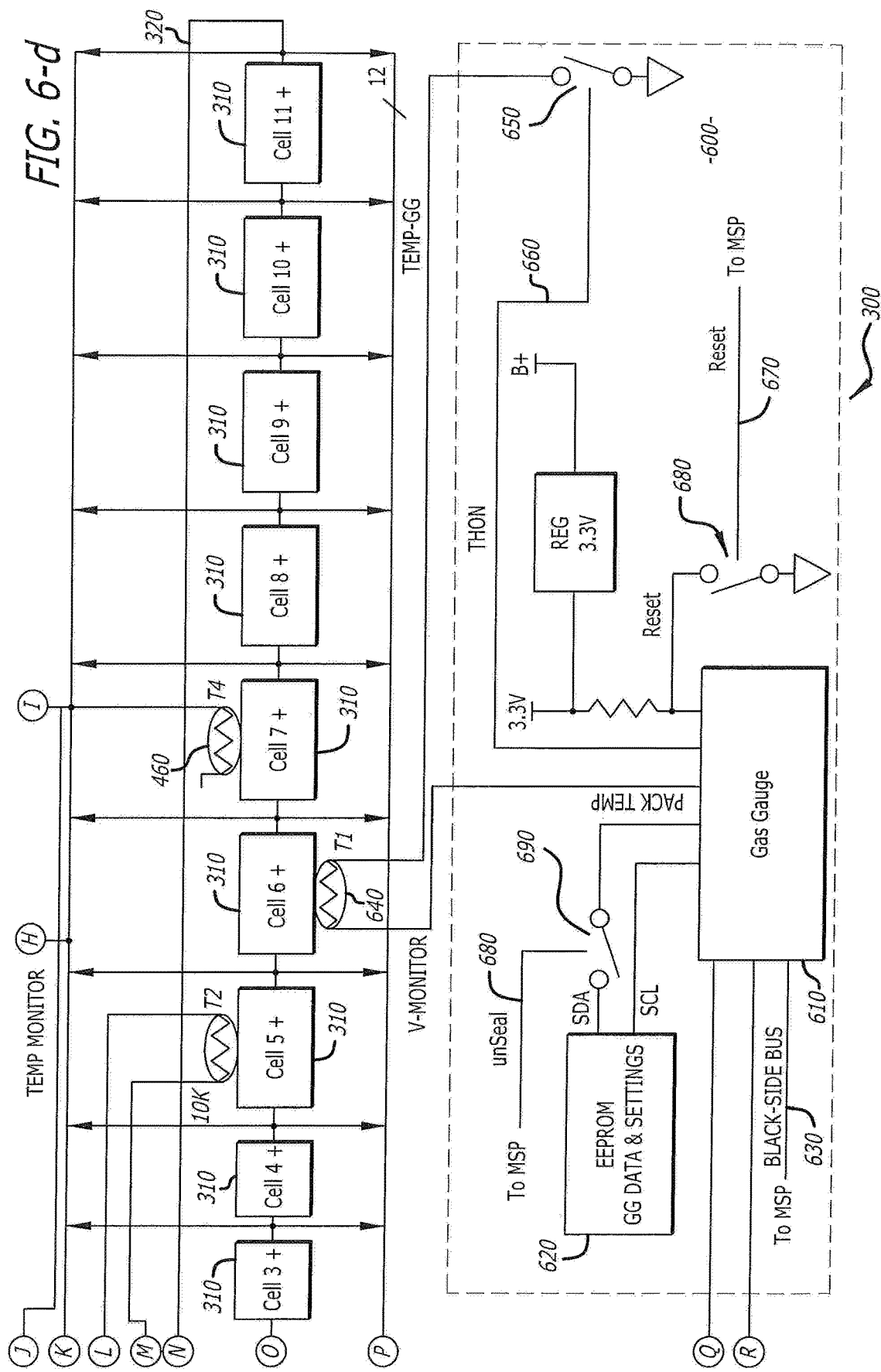
FIG. 6-d

SYSTEM AND METHOD FOR TRACKING AND ARCHIVING BATTERY PERFORMANCE DATA

CROSS-REFERENCES TO RELATED APPLICATIONS

This application is a continuation of U.S. application Ser. No. 14/949,649, filed Nov. 23, 2015, now U.S. Pat. No. 10,476,278, issued on Nov. 12, 2019, which is a continuation of U.S. application Ser. No. 13/458,996, filed Apr. 27, 2012, now U.S. Pat. No. 9,197,079, issued on Nov. 24, 2015 and claims the benefit of priority to U.S. Provisional Application No. 61/522,204, filed Aug. 10, 2011, and U.S. Provisional Application No. 61/480,286, filed Apr. 28, 2011, and to all of the patents and applications in the chain, all of which are incorporated herein in their entireties by reference.

This application is related to U.S. application Ser. No. 13/459,004, now U.S. Pat. No. 9,437,848, entitled "Latch Mechanism For Battery Retention," filed Apr. 27, 2012; U.S. application Ser. No. 13/458,973, now U.S. Pat. No. 8,729,957, entitled "Battery Management System With MOSFET Boost System," filed Apr. 27, 2012; U.S. application Ser. No. 13/458,988, now U.S. Pat. No. 9,825,475, entitled "System and Method For Automatic Detection Of Battery Insert," filed Apr. 27, 2012; U.S. application Ser. No. 13/458,952, now U.S. Pat. No. 9,099,877, entitled "Battery Management System For Control Of Lithium Power Cells," filed Apr. 27, 2012; and U.S. application Ser. No. 13/459,007, now U.S. Pat. No. 9,337,668, entitled "Viral Distribution of Data, Operating Parameters and Software Using A Battery As A Carrier," filed Apr. 27, 2012; the entireties of which are hereby incorporated herein by reference.

FIELD OF THE INVENTION

The invention is directed to a battery pack for providing power to a device. More specifically, the invention is directed to a battery pack and battery management system having a memory in which can be stored data related to the performance of the battery. The memory is accessible to both internal and external processors for retrieval and analysis of the data.

BACKGROUND OF THE INVENTION

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. Artificial respiration, such as mouth-to-mouth breathing or a bag mask apparatus, is used to supply air to the lungs. When a first aid provider performs manual chest compression effectively, blood flow in the body is about 25% to 30% of normal blood flow. However, even experienced paramedics cannot maintain adequate chest compressions for more than a few minutes. Hightower, et al., Decay In Quality Of Chest Compressions Over Time, 26 Ann. Emerg. Med. 300 (September 1995). Thus, CPR is not often successful at sustaining or reviving the patient. Nevertheless, if chest compressions could be adequately maintained, then cardiac arrest victims could be sustained for extended periods of time. Occasional reports of extended CPR efforts (45 to 90 minutes) have been reported, with the victims eventually being saved by coronary bypass surgery. See Tovar, et al., Successful Myocardial Revascularization and Neurologic Recovery, 22 Texas Heart J. 271 (1995).

In efforts to provide better blood flow and increase the effectiveness of bystander resuscitation efforts, various mechanical devices have been proposed for performing CPR. In one variation of such devices, a belt is placed around the patient's chest and an automatic chest compression device tightens the belt to effect chest compressions. Our own patents, Mollenauer et al., Resuscitation device having a motor driven belt to constrict/compress the chest, U.S. Pat. No. 6,142,962 (Nov. 7, 2000); Bystrom et al., Resuscitation and alert system, U.S. Pat. No. 6,090,056 (Jul. 18, 2000); Sherman et al., Modular CPR assist device, U.S. Pat. No. 6,066,106 (May 23, 2000); and Sherman et al., Modular CPR assist device, U.S. Pat. No. 6,398,745 (Jun. 4, 2002); and our application Ser. No. 09/866,377 filed on May 25, 2001, our application Ser. No. 10/192,771, filed Jul. 10, 2002 and our application Ser. No. 12/726,262, filed Mar. 17, 2010 show chest compression devices that compress a patient's chest with a belt. Each of these patents or applications is hereby incorporated by reference in their entireties.

Since seconds count during an emergency, any CPR device should be easy to use and facilitate rapid deployment of the device on the patient. Our own devices are easy to deploy quickly and may significantly increase the patient's chances of survival.

One important aspect of such devices is the need for small, powerful yet reliable power supply to power the device. It is not uncommon for CPR to be administered for at least thirty minutes. Thus, the power supply must be capable of delivering sufficient energy to the motor driving the compression device for at least that length of time. Moreover, the power supply must be relatively light weight, so as to enhance portability of the chest compression device, yet it must deliver its power for an extended period of time without significant voltage or current drop off to ensure consistency of compression throughout the treatment period.

Current batteries typically have no way to store data or information related to the overall history of use or performance of the battery. Such data would be useful because it would allow for analysis of the performance of the battery and potentially provide trend information regarding charging and discharging cycles, location of the battery, and the frequency of various problems or faults experienced by the battery.

When such batteries are used in conjunction with devices like mechanical CPR devices that are typically used by first responders such as the fire department or emergency medical technicians, the batteries tend to be exchanged between users. In such a case, a battery assigned to one fire station or ambulance crew may be picked up inadvertently by the crew from another station or ambulance during an emergency. In general, previous batteries have lacked an ability to sense their location and thus it was not possible to track the location of the battery in the event that the battery needed to be upgraded or recalled for maintenance or replacement.

As can be imagined, it is not atypical for batteries to be roughly handled during such emergency situations. Until now, however, the batteries have lacked the ability to sense a parameter associated with rough handling and thus could not make a record of it for future analysis to determine the extent to which rough handling affects the life and performance of the battery.

Even if a battery were capable of sensing and recording the type of events described above, batteries were typically unable to easily communicate the data stored in their memories to computer, server or other processor for analysis. At best, a battery memory, if existent at all, could be queried only when the battery was returned for maintenance or replacement.

What has been needed, and heretofore unavailable, is a light weight, reliable intelligent battery pack having a memory for storing a record of various events that would be useful in analyzing the performance, location and life of the battery. Such a memory would be able to be queried by external systems, such as servers, or other computers and processors either directly from a communication system included in the battery, or through a local or wide area network, intranet or the Internet. Such an accessible memory would allow the location of the battery to be tracked, which would be advantageous in cases where the battery needed to be updated or replaced. The present invention satisfies these, and other needs.

SUMMARY OF THE INVENTION

In a most general aspect, the invention provides a high-performance battery pack capable of reliably providing high power and current to power a device for a prolonged period of time. Moreover, the battery pack includes a battery management system that monitors and controls all aspects of battery operation, including charging and discharging of the battery. The battery management system is also capable of recording events that occur during the lifetime of the battery pack, and communicating those events for later analysis. The battery management system is also capable of being updated with enhanced or improved operating parameters, and is capable of managing various battery chemistries to provide for forward and backwards compatibility.

In yet another further aspect, the battery management system of the present invention may include one or more processors for monitoring and controlling the various functions of the battery management system. In another aspect, the one or more processors may be configured to communicate with internal and/or external memory storage or devices to provide for storage of events that occur during the lifetime of the battery pack. In still another aspect, the processors may be configured to communicate not only with internal or external storage media or devices, but may also be configured to communicate over a network with other processors, storage media or devices, or even other batteries or battery chargers. The network may be either wired or wireless.

In still another aspect, the battery management system of the present invention includes a memory in which can be stored data and information related to the performance of the battery. In an alternative aspect, the battery management system may also include a position locating system, such as, for example, a system based on global positioning satellite (GPS) technology, and the memory may be configured to store data and information related to the location of the battery.

In still another aspect, the battery may include a sensor, such as an accelerometer for sensing how the battery is handled during use, storage and transport, and the memory is configured to store information related to the handling of the battery so that the information and data may be retrieved and analyzed.

In a further aspect, the present invention includes a battery that has a memory that is used as a carrier to provide for the viral, or rapid, distribution of data, operating parameters and/or software updates to other batteries or the equipment that is powered by the batteries. In one aspect, the battery obtains updated data, operating parameters and/or software from the memory of a battery charger that is used to recharge a discharged battery. In another aspect, the recharged battery carries the updated data, operating parameters and/or software to a piece of equipment that utilizes the battery for power, and, once connected to the equipment, provides for distribution of the updated data, operating parameters and software to a memory and/or processor of the equipment. In still another aspect, the battery checks the memory of the charger or charging circuit, or the memory of the equipment or discharging circuit, to determine the relative date of data, operating parameters and/or software on both the battery and the equipment, and either provides updated data, operating parameters and/or software to the equipment, or retrieves later data, operating parameters and/or software from the equipment to update the memory of the battery and/or further distribute the updated data, operating parameters and/or software to other batteries or equipment.

In yet another aspect, the present invention includes a battery pack for powering a device, comprising: a rechargeable battery having a positive and a negative terminal; a sensor for monitoring a parameter related to operation of the rechargeable battery, a memory for storing data related to operation of the rechargeable battery, and a processor in electrical communication with the sensor and the memory, the processor configured to receive signals from the sensor and to store the data related to operation of the rechargeable battery extracted from the signals from the sensor in the memory, the processor also configured to retrieve the stored data from the memory and to communicate the stored data to a processor external to the battery pack. In one alternative aspect, the memory is an event archive.

In an alternative aspect, the processor external to the battery is a processor located in a battery charger. In yet another aspect, the processor is also configured to communicate with a processor in a device being powered by the battery pack, and wherein the processor in the device being powered by the battery pack communicates information related to an operational parameter of the device being powered by the battery pack to the processor for storage in the memory. In still another aspect, the data related to the operation of the rechargeable battery includes history data related to the operation of the rechargeable battery, and in yet another aspect, the data related to the operation of the rechargeable battery includes run time data.

In still another aspect, the data related to the operation of the rechargeable battery includes data selected from the group consisting of number of times the battery has been charged or discharged, a maximum or minimum lifetime load test voltage, a maximum or minimum lifetime load test current, a maximum or minimum lifetime load test power, a maximum lifetime peak charge temperature, a temperature sensor ID, a minimum lifetime peak charge temperature, a maximum lifetime peak discharge temperature, a lifetime full charge cycle count, a lifetime condition cycle count, a lifetime low power count, a lifetime wakeup count, a lifetime reset count, an lifetime total fault count, a lifetime cell under-voltage fault count, a lifetime over-current fault count and a last condition cycle time.

In yet another aspect, the data includes data related to identification of the rechargeable battery, and in an alternative aspect, the data related to identification of the rechargeable battery is a serial number. In yet another aspect, the data related to operation of the rechargeable battery includes a time stamp to identify a data and time the data was stored in the memory.

In still another aspect, the processor located in the charger is programmed to request that the processor of the rechargeable battery communicate the data stored in the memory to the processor located in the charger, and wherein the processor located in the charger stores the received data in a memory associated with the processor located in the charger. In yet another aspect, the processor located in the charger is configured to communicate the data stored in the memory associate with the processor located in the charger to a server remote from the charger.

In a further aspect, the battery pack further comprises: circuitry for determining a location of the battery pack from location signals received by a receiver in the battery pack; and wherein the processor stores the location of the battery pack in the memory. In another aspect, the processor stores the location of a device powered by the battery pack in the memory.

In still another aspect, the sensor is an accelerometer and the processor is configured to determine data related to forces experienced by the battery pack and also configured to store the data related to the forces experienced by the battery pack in the memory. In another aspect, the processor is configured to retrieve the stored data from memory in response to a request for the data received from a processor external to the battery pack. In still another aspect, the processor is configured to retrieve the stored data from memory and communicate the stored data to a processor external to the battery pack in response to the occurrence of an event sensed by the processor that causes the processor to execute a programmed command code.

In still another aspect, the present invention includes a battery pack for powering a device, comprising: a rechargeable battery having a positive and a negative terminal; a battery management system in electrical communication with the rechargeable battery, including a sensor for monitoring a performance parameter related to operation of the rechargeable battery, a memory for storing data related to operation of the rechargeable battery, and a processor in electrical communication with the sensor and the memory, the processor configured to receive signals from the sensor and to store the data related to operation of the rechargeable battery extracted from the signals from the sensor in the memory, the processor also configured to retrieve the stored data from the memory in response to a request for the data received from a processor external to the battery pack.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 6, FIG. 6-a, FIG. 6-b, FIG. 6-c, and FIG. 6-d are schematic diagrams of an embodiment of battery management system in accordance with principles of the present invention.

DETAILED DESCRIPTION OF THE PREFERRED EMBODIMENTS

Figure 1:
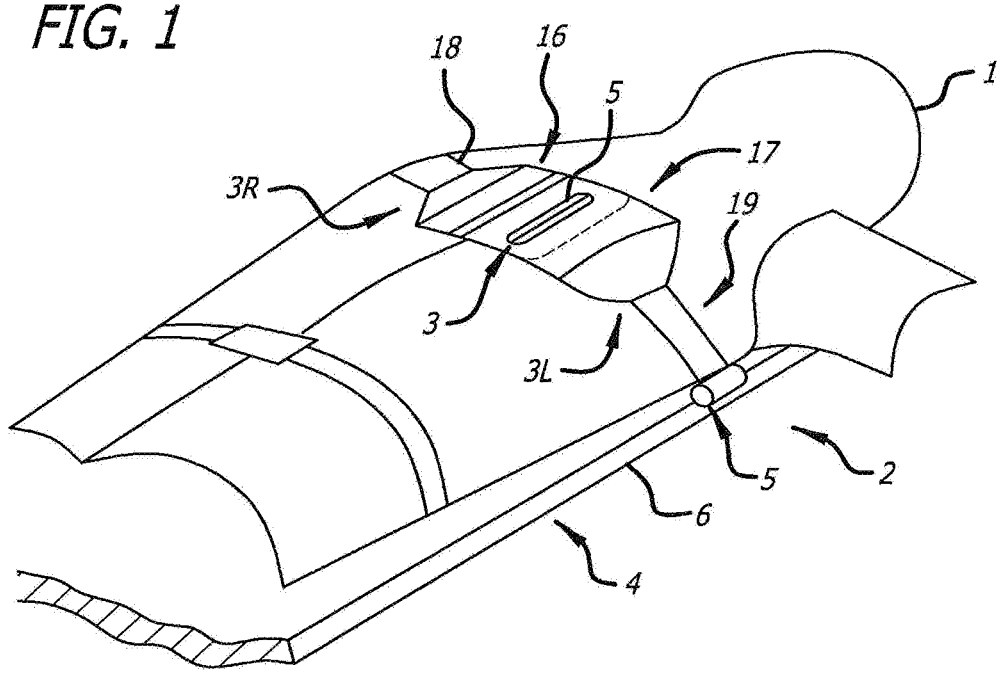
FIG. 1 illustrates a method of performing chest compressions on a patient by using a mechanical chest compression device.

The various embodiments of the present invention are directed to providing a rechargeable battery for powering mobile equipment, particularly medical devices. The embodiments of the invention are particularly advantageous when the battery is required to provide a large amount of current over a predictable period of time. Moreover, the embodiments of the invention include a battery management system that controls all aspects of the operation of the battery, and also includes a memory in which events related to the battery that occur during the battery's lifetime are stored. Moreover, embodiments of the battery management system include the capability of accommodating batteries using different battery chemistries, and are also capable of being updated through a communication port.

While the various embodiments of the invention are described with reference to a mechanical compressions device, those skilled in the art will immediately appreciate that those embodiments are not to be limited to powering such a device. Indeed, such a use is merely exemplary, and a battery in accordance with the various embodiments of the present invention may be used to power any device, and in particular, medical devices, wherein the design requirements of the device are met by the capabilities of such a battery.

When a battery in accordance with the various embodiments of the present invention is used with a mechanical compression device, the battery must be capable of powering the mechanical compression device for long enough to treat the patient not only in the field, but also during transport of the patient from the field to a care center. Experience has shown, however, that a patient's size and weight are factors that determine the amount of current drain on the battery during treatment. Accordingly, treatment of a larger than average patient results in a larger current draw on the battery.

For example, studies have found that the chest depth, chest breadth and chest circumference are factors influencing the amount of current drain on a battery powering a mechanical compression device. Other studies have observed that the mean chest depth of an average adult human male is 9.4 inches, mean chest breadth is 12.2 inches and mean chest circumference is 39.7 inches. See, Young, J W, R F Chandler, C C Snow, K M Robinette, G F Zehner, M S Lofberg, Anthropometric and Mass Distribution Characteristics of the Adult Female, FAA Civil Aeromedical Institute, Okalhoma City, Okla., Report No. FAA-AM-83-

16, 1983; Anthropometry and Mass Distribution for Human Analogues: Volume 1: Military Male Aviators, Report No. USAFSAM-TR-88-6, March, 1988; Haslegrave, C M, "Characterizing the anthropometric extremes of the population", *Ergonomics,* 29:2, pp. 281-301, 1986; Diffrient, N, A R Tilley, J C Bardagy, *Human Scale* 1/2/3, The MIT Press, Cambridge, Mass., 1974; and PeopleSize Pro Software, Open Ergonomics Ltd., 34 Bakewell Road, Loughborough, Leicestershire, LE11 5QY, United Kingdom, the entireties of which are hereby incorporated by reference herein. A battery that can sustain operation of the mechanical compression device for at least thirty minutes for an average size patient, and at least twenty minutes for a larger than average size patient is advantageous.

Referring now to the drawings in detail, in which like reference numerals indicate like or corresponding elements among the several figures, there is shown in FIG. 1 a chest compression belt fitted on a patient 1. A chest compression device 2 applies compressions with the belt 3, which has a right belt portion 3R and a left belt portion 3L. The chest compression device 2 includes a belt drive platform 4 and a compression belt cartridge 5 (which includes the belt). The belt drive platform includes a housing 6 upon which the patient rests, a means for tightening the belt, a processor and a user interface disposed on the housing. The belt includes pull straps 18 and 19 and wide load distribution sections 16 and 17 at the ends of the belt. The means for tightening the belt includes a motor attached to a drive spool, around which the belt spools and tightens during use. The design of the chest compression device, as shown herein, allows for a lightweight electro-mechanical chest compression device. The fully assembled chest compression device weighs only 29 pounds, and is thus hand-portable over long distances. The device itself weighs about 22.0 to 23.0 pounds, with the battery, in at least one embodiment of the present invention, weighing between 2 and 5.0 pounds, and preferably about 3 pounds. The belt cartridge weighs about 0.8 pounds and the straps to secure the patient weigh about 1.6 pounds.

Figure 2:
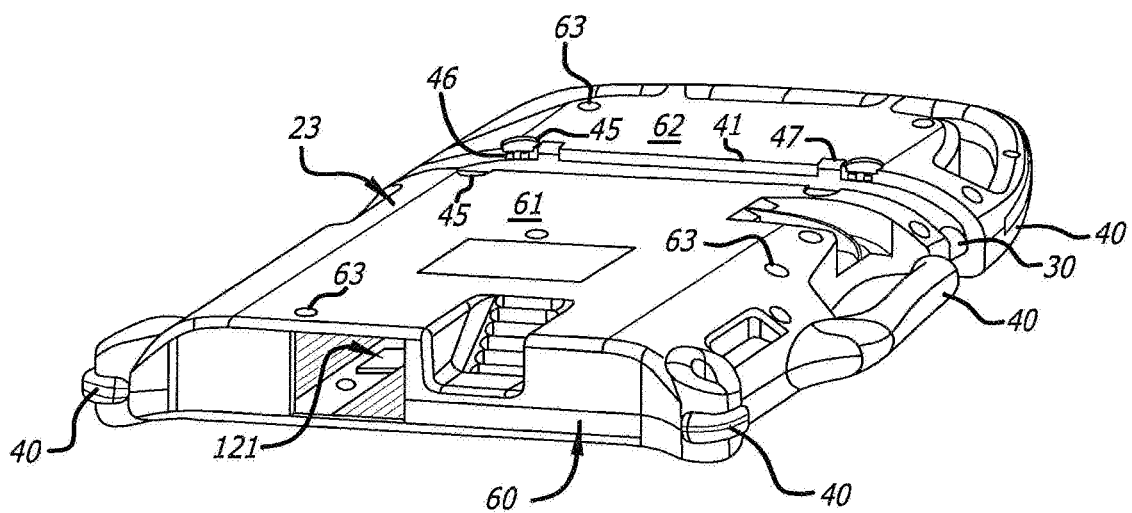
FIG. 2 is perspective view of the mechanical chest compression device of FIG. 1 showing the bottom and front sides of the device.

FIG. 2 shows the posterior side 23 of the chest compression device as seen from the superior direction. In the perspective of FIG. 2, the average sized patient's buttocks and the back of the patient's legs would extend past the inferior bumper 40. The device is built around a sturdy channel beam 41 that is laterally oriented with respect to the housing. The channel beam supports the device against the forces created during compressions. The channel beam also serves as the structure to which the belt cartridge is attached.

The channel beam 41 forms a channel extending across the lateral width of the device. During compressions, the belt is disposed in and travels along the channel. The belt is attached to a drive spool 42 that spans the channel.

Figure 3:
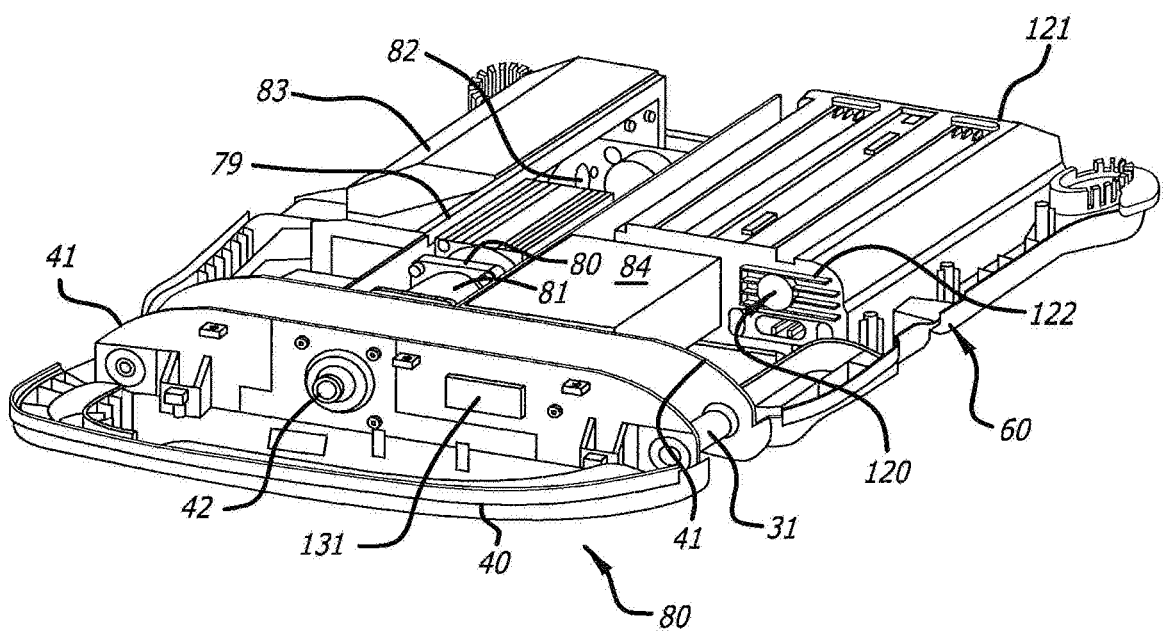
FIG. 3 is a perspective view of the mechanical chest compression device of FIG. 1 showing the bottom and rear cover plates removed.

FIG. 3 shows internal components of the chest compression device 2. A motor 79 is operable to provide torque to the drive spool 42 through a clutch 80 and a gearbox 81. A brake 82, attached to the superior side of the motor, is operable to brake the motion of the drive spool. The brake hub connects directly to the rotor shaft of the motor.

The motor 79 and brake 82 are controlled by a processor unit 83, motor controller 84 and power distribution controller, all of which are mounted to the inside of the anterior cover plate 60. The processor unit includes a computer processor, a non-volatile memory device and a display.

The processor unit is provided with software used to control the power controller and the motor controller. Together, the processor unit, power controller and motor controller make up a control system capable of precisely controlling the operation of the motor. Thus, the timing and force of compressions are automatically and precisely controlled for patients of varying sizes.

FIGS. 2 and 3 also show the location of a battery compartment 121 near the head of the patient. The location and design of the battery pack and battery compartment allow for rapid exchange of batteries. A spring in the back of the compartment forces the battery pack out unless the battery pack is fully and correctly inserted in the compartment. A latch on one end of the battery pack engages a receiver in the battery compartment 121 to hold the battery pack within the batter compartment when the battery pack is inserted into the battery compartment. Recesses 120 indicate the location of the springs inside the battery compartment 121. Plastic grills 122 at the end of the battery compartment reinforce the recesses.

Figure 4A:
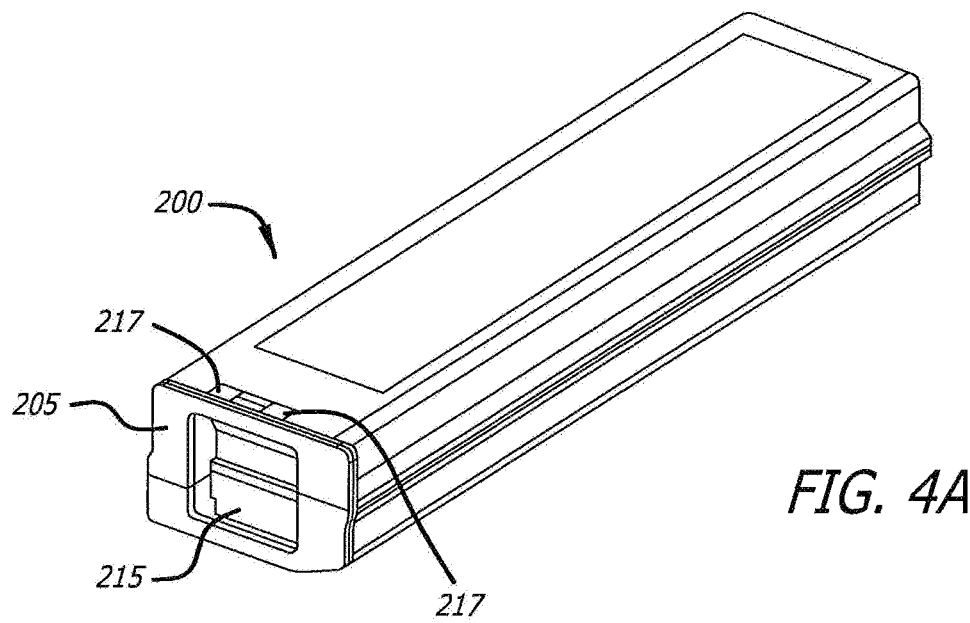
FIG. 4A is perspective view of a battery pack in accordance with the present invention showing a battery latch disposed on a front side of the battery pack.
Figure 4B:
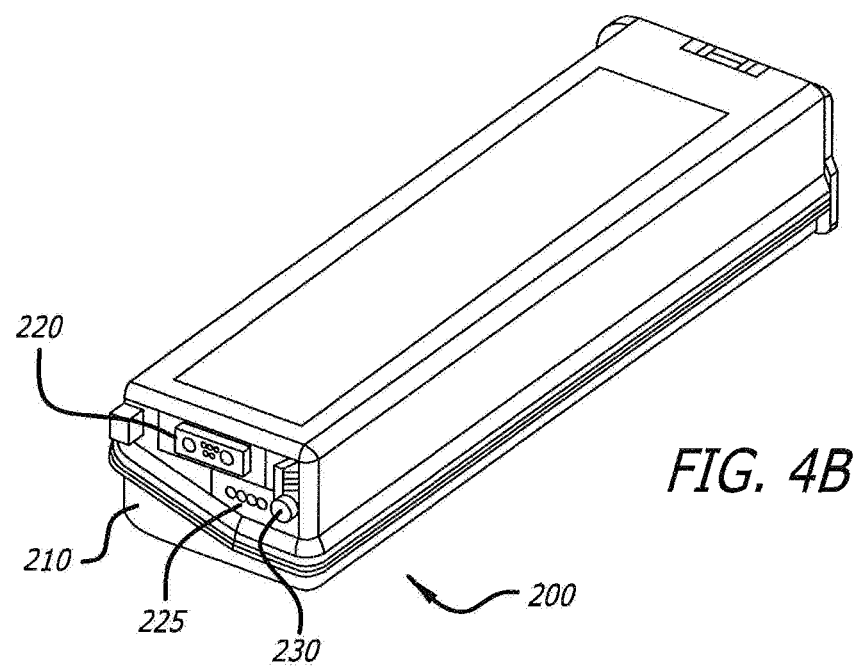
FIG. 4B is a perspective view of the battery pack of FIG. 4A showing a connector, indicator and button disposed on a back side of the battery pack.

FIGS. 4A and 4B are perspective views of a battery pack 200 showing the front and back sides 205, 210 of the battery pack respectively. Front side 205 of the battery pack faces outward and is visible to the user when the battery pack is inserted into the battery compartment 121 (FIG. 3). As shown in FIG. 4A, front side 205 includes a latch 215 that engages a receiver within battery compartment 121 to hold the battery pack 200 within the battery compartment. Also shown in FIG. 4A are a pair of raised tabs 217 disposed on the tops side of the front end of the battery pack. These tabs cooperate with the latch to ensure that the battery is properly seated in the battery compartment by prevent the top of the battery from riding up during battery insertion, forcing the latch into proper engagement with a battery latch receiver or lip of the battery compartment.

The back side 210 of the battery pack, as seen in FIG. 4B, includes a connection 220 that connects to a connector within battery compartment 121 to enable electrical communication between the controller or processor of the mechanical compression device and the battery pack 200. This connector not only allows for the flow of current from the battery pack to power the mechanical compression device, but it also provides for the flow of data, programming commands and other information, such as battery charge status, discharge rate, time remaining until discharged, and the like between the battery pack and the processor or computer controlling the operation of the mechanical compression device. Similarly, connector 220 may be configured to be connected to a connector in a battery charger to charge the cells of the battery pack, as well as to provide for the flow of data, software programs or commands and/or other information between the charger and the battery pack. It is also contemplated that connector 220 may be used to connect the battery pack to a communication network that would allow for flow of information between the battery pack and other computers, servers, processor or devices that are also connected to the network. It will be understood that the network may be a wired network, such as, for example, an Ethernet, or it may be a wireless network. The network may be a local network, or it may be a wide area network, such as a WLAN or the Internet.

A status indicator 225, which may be, for example, one or more light emitting diodes (LEDs) or similar devices, is also disposed on the back end 210 of battery pack 200 to provide a visual indication of, for example, the charge/discharge status of the battery pack, the presence of any faults that would affect the operation of the battery pack, or other information that might be useful to the user of the battery. A push button 230 is also included; button 230 may be used, for example, to initiate a reset of the battery pack. Alternatively, button 230 may be used to initiate a diagnostic test, the results of which may be indicated by status indicator 225. In other embodiments, pressing button 230 may initiate other functions of the processor in the battery pack, including, for example, and not by way of limitation, determining the remaining capacity of the battery, display of fault codes through the use of status indicator 225 and the like.

Figure 5:
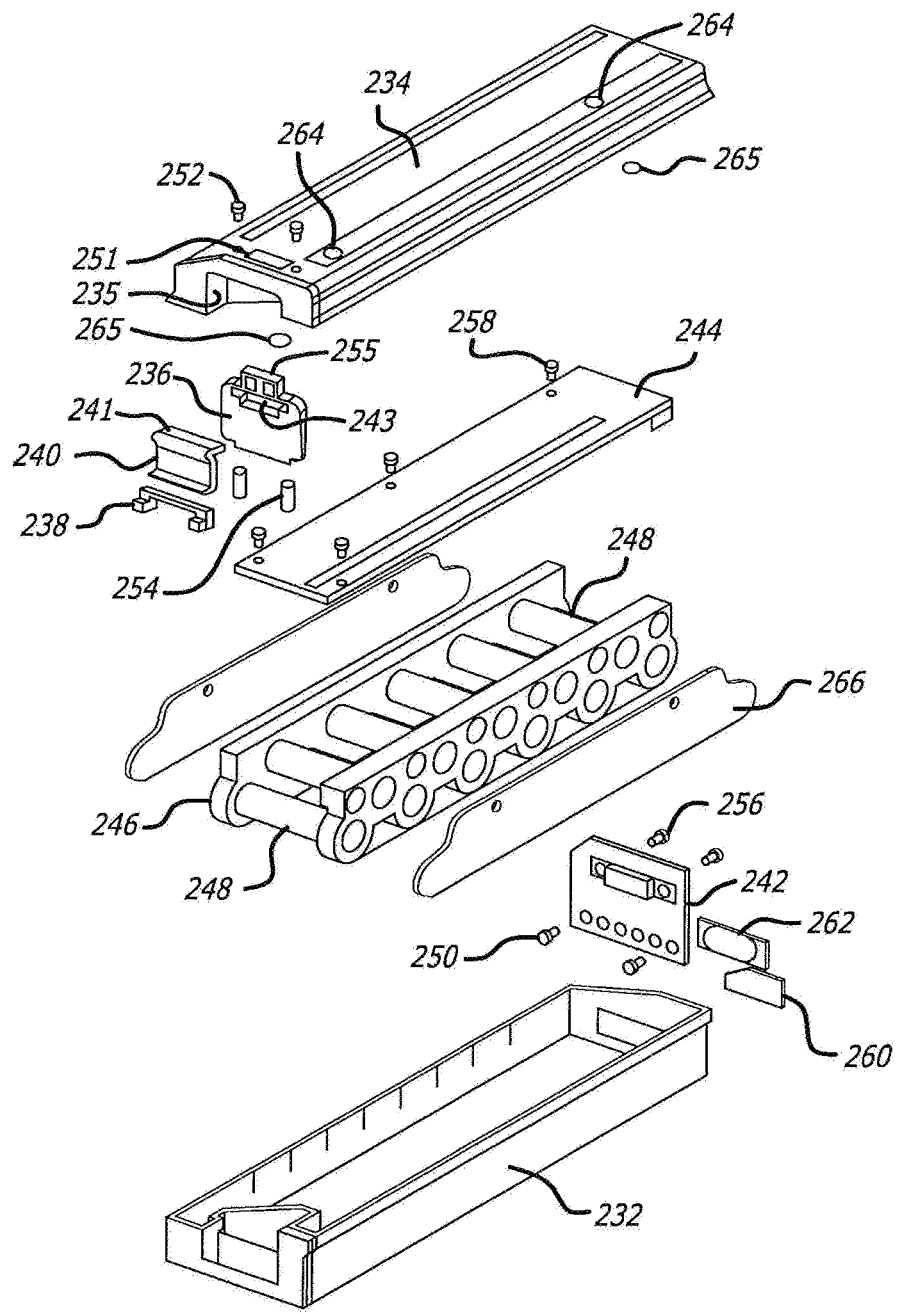
FIG. 5 is an exploded perspective view illustrating various components of one embodiment of a battery pack of the present invention.

FIG. 5 is an exploded perspective view of the battery pack 200. The battery pack 200 in this exploded view has been inverted from the view of FIGS. 4A and 4B. The battery pack has a bottom enclosure 234 and a top enclosure 232. A battery latch assembly having a battery latch 236, a lever base 238 and a lever latch 240 is mounted at the side of the battery pack facing outward when the battery pack is inserted into a battery compartment, and is held in place by the bottom and top enclosures. Lever latch 240 has a wing 241 that is inserted into a groove or slot 243 formed in a face of battery latch 236, and lever base 238 is mounted on the bottom enclosure to pivotally hold lever latch 240 in the enclosure. Compression springs 254 are disposed between a bottom end of battery latch 236 and top enclosure 232. A projection 255 is disposed a top end of battery latch 238, and is configured to protrude through slot 251 that extends through a thickness of the bottom enclosure 234. In this manner, battery latch 236 may be manipulated by a user to engage and disengage projection 255 from the latch receiver located in the mechanical compression device to insert the battery pack into the battery compartment and to release the battery pack for removal from battery compartment 121.

Disposed at the back end 210 of the battery pack is a battery entry board 242 to which is mounted connector 220, indicator 225 and button 230 (FIG. 4B). Entry board 256 is mounted to bottom enclosure 232 using one or more screws 250. The entry board may also be fastened to top enclosure 252 using one or more screws 256. In some embodiments, a water resistant gasket 262 may be used to resist the incursion of fluids into the interior of the battery pack. Moreover, a label 260 may be used to provide information to a user relative to the various indications that may be provided by indicator(s) 225.

A battery management board 244 to which is mounted processors, memory and electrical circuitry for managing the various operations of the battery (which is described in more detail below) is mounted using screws or other fasteners 258 to battery cell assembly 246. Battery cell assembly 246 includes one or more battery cells 248. Battery cells 248 may be cells utilizing a variety of battery chemistries, such as, for example, nickel metal hydride, lithium hydride, lithium-ion and the like. Battery management board 244 and battery cell assembly 246 may also include a pair of splatter shields 266 mounted on left and right sides of battery cell assembly 246 to protect the terminals of the individual battery cells 248 from inadvertent contact with other parts of the assembly, thus providing a shield against short circuit of the battery cells.

Battery pack 200 also includes at least one vent 264, shown disposed in the top enclosure to allow for venting of the battery pack to prevent buildup of potentially flammable or explosive gases produced by the battery cells 248 during charging or discharging of the battery pack. While shown disposed in the top enclosure, those skilled in the art will appreciate that the vents may be disposed through any wall or side of the battery pack. Vents 264 may be a simple hole extending through the wall or side of the battery pack. Alternatively, vent 264 may include a filtering means 265, such as a screen or hydrophobic membrane to prevent the incursion of particulates or fluids or moisture into the interior of the battery pack. An additional advantage of such vents is that the vent or vents provide for equalization of pressure between the interior and exterior of the battery pack, such as may occur when the battery pack is transported to a higher or lower altitude.

The mechanical compression device described above requires a reliable power source to operate. It is not unusual for the device to be required to be used for thirty minutes or more to provide resuscitation to a patient in an emergency. The torque and power requirements of the motor of the mechanical compression device require up to a peak of seventy amperes of current during compression. If enough current cannot be delivered by the battery to the motor controlling the compressions, the voltage falls off and the motor may not be capable of generating enough torque to ensure complete compression of a patient's chest.

The inventors of the present invention have realized that having a very low total internal resistance is key to ensuring extended and reliable operation of the battery when the battery is under a constant power drain. One such battery chemistry that has been found to be useful in devices requiring high power is a battery using Lithium Ion chemistry, such as the model ANR26650M1-A or ANR26650M1-B Lithium Ion cell available from A123 Systems, Incorporated.

FIG. 6 is a schematic diagram illustrating one embodiment of a battery pack 300 in accordance with the present invention. Battery pack 300 includes eleven Li-Ion chemistry cells, such as the model ANR26650M1-A or ANR26650M1-B cells described above. Each cell provides 3.3 volts, and the eleven cells are connected in series to provide a total of 36.3 volts. Using such cells, one embodiment of a battery pack in accordance with principles of the present invention can be manufactured that weighs approximately three pounds. Such a battery has been observed to deliver between 1550 and 2000 watts, and preferably deliver a peak power of 1800 watts. This provides a desirable weight to power ratio. Moreover, such an embodiment has also been found to be able to deliver energy of slightly less than 100 watt/hours. While eleven battery cells are used in this exemplary embodiment, more or less cells could be used depending on the requirements of the device to be powered.

To provide the amount of current required to operate the motor of the compression device, the inventors have discovered that it is important to minimize the internal resistance of the battery pack. Accordingly, the Lithium Ion (Li-Ion) cells used should have low internal DC resistance, preferably below 15 milliohms, and more preferably below 12.5 milliohms per cell.

While Li-Ion batteries are capable of providing the voltage and current required to operate a mechanical compression device for extended periods of time, care must be taken during both the discharge phase, and recharge of the batteries to ensure that the batteries continue to function for their desired lifetimes. It is well known that Li-Ion cells should not be over charged, nor should they be over discharged. Accordingly, various embodiments of the present invention include the capability of monitoring and controlling both the discharge of the cells and the recharging cycle. Those embodiments will be discussed in more detail below.

As described previously, the eleven Li-Ion cells 310 are connected in series by a main power bus 320. Bus 320 has both a positive side and a negative, or ground side, as is typical for a DC circuit. Bus 320 delivers the direct current provided by the battery cells to a load (in this example, the mechanical compression device) through an interface 330. As shown in FIG. 6, interface 330 is a pin connector having seven connection pins. Alternatively, a socket could be used, or a combination of pins and sockets, with more or less than seven pins or sockets could be used.

The positive side of bus 320 is connected to pin 7 of interface 330. Similarly, the negative side of bus 320 is connected to pin 6 of interface 330. Pins 1-5 of interface are used to communicate various signals involved in the monitoring and control of the battery pack, as well as for communication to the device that is being powered, enabling the exchange of information and control signals between the battery pack and the powered device. Various exemplary embodiments of the invention incorporating those features will be discussed in more detail below.

Returning again to FIG. 6, the positive side of bus 320 includes a fuse 342 to protect the circuit from over current conditions. Fuse 342 may be, for example, a 30 ampere fuse. In such a case, a sustained current flow through fuse 342 of more than 30 amperes would cause the fuse to open, breaking the circuit created by bus 320 and stopping the flow of current from the battery cells. While not shown, there is also a blown fuse detector circuit that monitors the fuse, and, if the fuse is blown, provides a signal to the pack controller that the fuse is blown. The pack controller may then provide a signal indicating that the battery is not suitable for use. Such a signal, for example, may be the change in color of and LED, or activation or de-activation of some other status indicator. Alternatively, the pack control may provide a signal to the equipment powered by the battery, which may then provide an indication to a user that the battery is not ready for use.

The positive side of main bus 320 also includes a number of n-channel field effect transistors (n-FET) 340, 350 and 360. These n-FETs provide for switching and control of the circuit. N-FETs are used because they provide a very low resistance switch in keeping with the design requirement of minimizing the total internal resistance of the battery. Another unique capability of the n-FET is that they are capable of conducting high current loads, without damage and without generating excessive amounts of heat. One example of an n-FET that has been found suitable for use in various embodiments of the present invention is the model IRLS3036, available from Digi-Key Corporation.

In typical designs, p-FET devices would be used as the switches and would be placed in the high side of the main bus. However, p-FETS have two or more times the on resistance of an n-FET device. Thus, to handle the same current as an n-FET device, several p-FETs wired in parallel would be needed. Moreover, use of several p-FETS may also require the use of a heat sink to dissipate heat generated while the p-FET is on. This is disadvantageous where space within the battery pack is limited.

Similarly, an n-FET device would typically be used in the low side of the main bus to switch the current on and off in the bus. However, use of an n-FET in this situation breaks the ground of the battery, which may cause noise in the circuit and interfere with communication between the various elements of the battery management system circuitry. Accordingly, the inventions have placed the n-FET switches in the high side of the bus, which provides efficient switching of the bus without the generation of excess heat that may occur when p-FETs are used. Placing the n-FETs in the high side of the bus also eliminates the problem of breaking the ground of circuit.

In some embodiments, one or more resistors, such as resistors 370 and 380, may be inserted in the negative, or low, side of the main bus circuit. These resistors provide the ability to tap the main bus to monitor various aspects of the current flowing through the circuit. For example, in one embodiment, resistor 370 is connected across the input lines of a cell balancing and primary protection circuit, which is discussed in more detail below. A typical value for resistor 370 is, for example, 2.5 milliohms.

In another embodiment, resistor 380 may be connected across a state-of-charge monitor, also known as a "gas gauge." In this embodiment, the value of resistor 380 may be, for example, 5 milliohms.

Each of the cells 310 is individually monitored during both charging and discharging to control the rate of charging and discharging, respectively. In one exemplary embodiment, as shown in FIG. 6, a separate cell tap line 390 is connected to each cell and to a cell monitoring and balancing circuit 400.

Primary Protection

During charging, the voltage of each cell is independently monitored to prevent overcharging of the cell. In one exemplary embodiment, a monitoring system on a microchip, which may be, for example, battery pack protection and monitor integrated circuit (IC) 410 such as an OZ890 available from O₂ Micro, is used to control the charging of the various cells. In such an arrangement, cell monitoring line 390 provides a positive signal to a representative pin input of IC 410. For example, cell 1 is monitored using input line BC1 of IC 410, and so forth up to cell 11, which is monitored using input line BC11 of IC 410.

If the control circuitry of IC 410 detects an imbalance in a cell, IC 410 provides a signal on an appropriate external bleed control line CB1-CB11. As shown in FIG. 6, when the signal on the appropriate external bleed control line is applied to the gate of n-FET 420, current is allowed to pass between the source and the drain of n-FET 420 and then through resistor 430, which results in bypassing the cell and halting charging of the cell. As can be seen from FIG. 6, each cell has its own dedicated combination of resistor and n-FET in electrical communication with IC 410 for monitoring each cell and preventing each individual cell from over charging.

Cell balancing and primary protection IC 410 may also be used in some embodiments to monitor the total voltage of the battery cell pack. For example, when all of the cells have attained their maximum voltage, IC 410 can send a low signal to the gate of n-FET 350 to open the channel between the source an drain of n-FET 350 and thus open the main bus circuit 320. This results in a cessation of charging current through the cells, and thus halts the charging process.

Similarly, IC 410 monitors the voltage across the cells during discharge of the battery. When the voltage across the cells drops below a threshold level, for example, 21 volts, IC 410 drives the signal on line 450 low, which in turn shuts off n-FET 360 which interrupts the main bus circuit. This prevents damage to the battery cells that may be caused by removing too much of the charge in the cells, which may result in decreased life of the cell.

IC 410 may also include and control a temperature measurement capability designed to monitor the temperature of the battery pack and/or individual battery cells to prevent overheating. In this embodiment, one or more thermistors 460 are used to provide temperature signals over line 470 to the IC 410. If IC 410 determines that the temperature of the battery is either too high or too low, IC 410 may drive either or both of n-FETs 350 and 360 low, opening the main bus 320 and isolating the battery pack. It will be understood that while only a single line 470 is shown for clarity, line 470 includes an appropriate number of conductors to monitor the function of all thermistors used in the temperature monitoring circuit in communication with IC 410.

IC 410 may additionally provide a visual indication of fault state by providing a fault signal on line 480 that may then be used to cause LED 490 to light up. This visual signal of a fault condition sensed by the primary protection circuit indicates that the battery pack has been rendered non-functional by IC 410 and that repair or maintenance of the battery pack may be required.

Secondary Protection

Some embodiments of the present invention may also include secondary protection against catastrophic faults or over voltage protection. Such secondary protection may be provided by a variety of circuits designed to monitor the voltage of the battery pack and/or the current flow through the main bus and to take action when certain thresholds values of current or voltage are exceeded. In one embodiment, such protection may be provided by an integrated circuit 500, such as, for example, the OZ8800 available from $O_2$Micro. Those skilled in the art will know that, depending on the number of cells used in the battery pack, more than one IC 500 may be required. For example, the OZ8800 secondary level battery protection integrated circuit can monitor three to seven individual cells. Thus, where eleven cells are used, two OZ8800s will be required.

IC 500 monitors the voltage of each cell over monitoring line 312. In some embodiments, a time delay may be employed that provides for temporary over voltage conditions to exist. Where the time threshold is exceeded because the voltage did not drop back into an acceptable range, IC 500 sends a low signal over fault line 510 to n-FET 340 to turn off n-FET 340. Each cell is monitored by a similar circuit.

It should be apparent from FIG. 6 that the n-FETs described above are in a normally off state unless a positive voltage is applied to the gate of each n-FET. Thus, any fault that results in voltage decrease to a level below the threshold of the n-FET at the gate will cause the n-FET to open, thus providing additional protection to the cells and battery management circuitry.

Gas Gauge

Another embodiment of the present invention includes a "gas gauge" function that monitors the amount of useful charge remaining in the battery pack. Such gas gauge functionality can be provided using integrated circuits designed to carry out vary tasks, such as to calculate remaining battery capacity for use and standby conditions based on time of use, rate of discharge and the temperature of the battery. Such a circuit may also determine the true battery capacity in the course of a discharge cycle from near full charge to near full discharge states.

FIG. 6 illustrates one example of such a gas gauge circuit 600. Monitoring of the battery pack is accomplished using an integrated circuit 610, such as a bq2060A available from Texas Instruments, Inc. IC 610 works in conjunction with an external EEPROM 620. EEPROM 620 stores configuration information for IC 610, such as the chemistry used in the battery cells, the self-discharge rate of the battery, various rate compensation factors, measurement calibration, and battery design voltage and capacity. All of these settings can be changed to allow the system to be used with a variety of battery types. Moreover, IC 610 can communicate with a central processor and memory over a back-side bus circuit 630. In this manner, IC 610 and EEPROM 620 may be configured, using control signals from the central processor, to accommodate different types of batteries that are detected and identified by other circuitry included in the system, or which are manually identified by a user. In an alternative embodiment, IC 610 may also cooperate with the pack controller to augment the reporting accuracy of the gas gauge in instances of low current draw using appropriate control commands embedded into the software that controls the operation of the pack controller and the gas gauge to implement the algorithms necessary to carry out this function.

In general, the gas gauge functions are carried out by IC 610 in conjunction with IC 800 to determines full charge battery capacity and the capacity remaining at any point in time by monitoring the amount of charge input or removed from the battery cells. In addition, IC 610 measures battery voltage, battery temperature and current as detected across resistor 380. IC 610 also, in some embodiments, may estimate the self-discharge rate of the battery, and also monitors for low-voltage thresholds of the battery. As described, IC 610 measures the amount of charge and discharge of the battery by monitoring the voltage across resistor 380, which is located between the negative terminal of the first cell 310 (of the series connected cells) the negative terminal of the battery pack. Available battery charge is determined from this measured voltage and correcting the measurement for environmental and operating conditions.

IC 610 may also measure the temperature of the battery pack so as to carry out the estimations and adjustments described above. In one embodiment, a thermistor 640 is mounted adjacent to a cell or cells of the battery pack in such a manner as to be able to measure the temperature of the cell or cells of the battery pack. IC 610 drives the gate of n-FET 650 high by providing an appropriate signal over line 660 to connect a bias voltage source to thermistor 640 while the temperature of the cell or cells is being measured. Once the measurement is completed, IC 610 drives the gate of n-FET 650 low, opening the n-FET and thus disconnecting thermistor 640 from the bias source.

IC 610 may be reset each time the battery is charged so that the reported amount of charge remaining in the battery is accurate. A battery pack supervisor circuit or pack controller 800, to be described in more detail below, provides a signal over reset line 670 to drive the gate of n-FET 680 high. This causes the current to flow through n-FET 680, resulting in a reset signal being provided to IC 610 to reset the battery capacity counter of IC 610.

In another embodiment, IC 610 may include a seal/unseal function that prevents unauthorized access to the parameters stored in the IC 610 or EEPROM 620. Pack controller 800 may send a signal over line 680 that drives the gate of n-FET 690 high, which closes n-FET 690 allowing for commands and data to flow between IC 610 and EEPROM 630. Such data may include, for example, updated calibration information and the like. In an alternative embodiment, the flow of data between IC 610 and EEPROM 630 may be controlled using only software commands from the pack controller to control IC 610 and EEPROM 630 without requiring n-FET 690.

Pack Controller

In another embodiment of the present invention, the battery management system includes a pack controller 800 which serves as an overall supervisor for the various functions carried out by the battery management system. Pack controller 800 will typically be an integrated circuit, although discrete circuitry carrying out the same functions could be used, depending on the amount of space available within the confines of the battery pack.

For example, pack controller 800 may be a low or ultra-low power microcontroller such as the MSP430F2418 Mixed Signal Controller available from Texas Instruments Incorporated. Such a controller may include memory, such as random access memory or flash memory to provide for rapid and efficient execution of the various functions of the battery management system. Pack controller 800 also has the capability of communicating with peripheral devices, circuitry or memory over one or more communication buses, such as backside bus 630 and front-side 810. The communication busses typically use a communication protocol such as, for example, the I$^2$C bus (a Trademark of Philips Incorporated) or the System Management Bus (SMBus). The SMBus is described in more detail below.

Appropriate software commands are used to program the functions of the pack controller 800. Such software includes commands configuring the communication protocol interface, such as for example, the SMBus interface. The software would also configure the pack controller to monitor critical battery pack parameters, which are made available to it over communication lines 810, 820, 822, back-side bus 630, front side bus 810 and detect line 824, as well as other communications lines not shown or which may be added in the future.

When appropriately programmed, pack controller 800 is also in communication with one or more memory devices, such as, for example, an event archive EEPROM 900. Such an archive has, for example, although not limited to, 64 kilobytes of memory that can be used to store history of various events that occur during the charge and discharge cycles of the battery pack, such as, for examples, the total amount of charge, total amount of energy discharged, the temperature of the battery cells, any faults that occur, or other information related to the individual battery cells and/or the various circuits employed to manage and control the operation of the battery.

Pack controller 800 may also be programmed to communicate with memory and/or processors such as, for example, EEPROM 1000. In the exemplary embodiment shown in FIG. 6, EEPROM 1000 may be located in a mechanical compression device that is powered by the battery pack, or it may be incorporated into the battery pack and configured to be accessed by the devices to be powered by the battery. In this example, pack controller 800 communicates with EEPROM 1000 and/or a processor in the mechanical compression device over front side bus 810, which accesses a similar bus in the mechanical compression device through connector 330. In this manner, a two-way communication connection may be established between the battery pack and a device powered by the battery pack to allow for exchange of information between the battery pack and the powered device. For example, updated operating parameters or commands, including updated software, may be loaded into the battery pack from the powered device when the battery pack is put into communication with the powered device. Similarly, information contained in the event archive EEPROM 900 may be transmitted to the EEPROM 1000, or any other memory (such as a portable memory device) configured for communication over back-side bus 810 from any of the memories present in the battery pack.

It will be understood that this communication capability also allows the battery to communicate with other devices besides devices which will be powered by the battery. For example, typically, the battery pack will be removed from a powered device to be recharged. When the battery pack is connected to a battery charger, the battery charger may be used to retrieve information from the memory or memories of the battery pack, and/or transmit updated data, information, programming commands or software to the battery through front-side bus 810. This communication process will typically be managed using various handshaking and communication dialog as set forth in the communication protocol used to enable the communication, such as the SMBus protocol, exchanged between a processor residing in the charger or other device and the pack controller 800 of the battery pack. In some embodiments, the battery may also be trickle charged when the battery is inserted into the device to be powered, where the device being powered is also connected to an external power supply.

Still other embodiments of the present invention may include a capability, managed by pack controller 800, of recognizing when the battery pack is inserted into a battery charger or device to be powered, such as a mechanical compression device. For example, pack controller 800 may be configured using appropriate software and/or hardware commands to provide a signal to IC 410 and IC 500 to provide a high signal to the gates of n-FETs 340, 350 and 360 to close those switches and thus provide full battery voltage at the positive and negative pins of connector 330 only when detect circuit 1100 sends an appropriate signal to pack controller 800 over line 824 indicating that the battery pack is properly mounted into a device to be powered.

In one embodiment, pack controller 800 monitors a line connected to a mechanical switch or interlock that is forced closed when the battery is properly inserted into a charger or a device to be powered. In another embodiment, pack controller 800 monitors a signal line connected to one or more pins of the battery connector. When an appropriate signal is received over this signal line, pack controller 800 determines that the battery is inserted into a charger or a device to be powered, and provides a high signal to the gates of n-FETs 340, 350 and 360 as described above. This embodiment is particularly advantageous in that pack controller 800 may be programmed to respond only when a particular signal is received, ensuring that the battery is inserted into a specific type or make of a charger or device to be powered designed to accommodate the battery before providing the high signal to the gates of n-FETs 340, 350 and 360.

These embodiments are advantageous in that discharge of the battery in the event of an accidental short circuit across the positive and negative terminals of connector 330 is prevented. Given the amount of energy stored in the cells of the battery pack, such a discharge could be catastrophic. Thus, in this embodiment, there is no voltage between the positive and negative terminals of connector 330 of the battery pack unless the battery pack is properly mounted in a device configured to provide the appropriate signal to the detect circuit 1100, thus providing for safe handling, storage and transport of the battery back when the battery pack is not connected to either a charger or a device to be powered, such as the mechanical compression device described above.

Pack controller 800 may also be programmed to provide password access to allow for changing of settings and parameters stored in EEPROMs 900 and 620, as well as to provide appropriate signals to drive LED 490 in the event of a fault. Additional capabilities may also be included, configured using appropriate software and/or hardware commands, to provide additional functions to the battery management system. For example, such functions may include driving a display that indicates the total amount of charge remaining in the battery and the like. A more complete description of the various capabilities that can be incorporated into pack controller 800, particularly when pack controller 800 is an MSP430F2418 (or other members of this controller family) is contained in a document entitled "MSP430F241x, MSP430F261x Mixed Signal Microcontroller," SLAS541F—June 2007—Revised December 2009 available from Texas Instruments Incorporated, the entirety of which is hereby incorporated herein by reference.

Smart Bus Communications

As will be apparent, the various processors and integrated circuits and logic systems incorporated into the various embodiments of the present invention are capable of functioning as a unified system due to their ability to communicate with one another over the front side bus 320 and the back side bus 630. In some embodiments, the communications over these buses are carried out using the System Management Bus (SMBus) specification. The SMBus is a two-wire interface through which various system component chips, such as IC 410, IC 610, the secondary protection system 500, event archive 900, EEPROM 1000 and pack controller 800, among other circuitry, can communicate with each other and with the rest of the system. Further information related to the SMBus specification is contained in "System Management Bus (SMBus) Specification Version 2.0," SBS Implementers Forum, Aug. 3, 2000, the entirety of which is hereby incorporated herein by reference.

Boost Circuit

The inventors have observed that, in some embodiments of the invention, the voltage required to drive the n-FETs closed exceeds the voltage that is available from the battery pack. For example, using an n-FET that requires a bias voltage of 10 volts, the n-FET requires a drive voltage of the bias voltage plus the battery voltage to drive the n-FET sufficiently to allow an appropriate voltage to pass through the n-FET to charge or discharge the battery. Accordingly, a voltage boost circuit is included to boost the voltage supplied to the gates of the n-FETs to drive the n-FETs to conduct the current supplied by the battery cells.

Those skilled in the art will understand that the use of n-FETs in the present invention results in the need for complex circuitry, such as the boost circuit. Such complexity could be eliminated using p-FETs. Use of p-FETs however, has been found to be disadvantageous because several p-FETs may be needed to handle the same current that can be handled by a single n-FET. Additionally, the heat generated using multiple p-FETs may require the addition of one or more heat sinks to dissipate the heat, which may require more space in a compact battery than which is available. Moreover, it is well known that p-FETs have at least twice the on resistance of n-FETs, which would increase the overall internal resistance of the battery pack.

Archive Memory

Referring again to FIG. 6, pack controller 800 is in communication with event archive EEPROM 900. In one embodiment, event archive EEPROM 900 is a non-volatile memory device, such as a flash memory device, having, for example, 64 kilobytes of memory capacity. As described previously, the pack controller 800 may store data and information related to usage, operation and performance of the battery pack in event archive 900 for later retrieval and analysis.

Table 1 is an exemplary listing of data or information related to the long term history of the battery that may be sensed or collected by pack controller 800 during the lifetime of the battery and then stored in the event archive 900. It will be understood that while certain fields are shown, other data fields may be used, depending only on the design requirements of the system.

TABLE 1

| Data Field | Size (Byte) | Size w/ CRC | Unit | Address Offset Start | Address Offset End |
|---|---|---|---|---|---|
| Battery Clock | 4 | 5 | sec | 0 | 4 |
| Number of charges starting at FCC>= RC>FCC-250 | 2 | 3 | | 5 | 7 |
| Number of charges starting at FCC-250>=RC>FCC-500 | 2 | 3 | | 8 | 10 |
| Number of charges starting at FCC-500>=RC>FCC-750 | 2 | 3 | | 11 | 13 |
| Number of charges startingat FCC-750>= RC>FCC-1000 | 2 | 3 | | 14 | 16 |
| Number of charges starting at FCC-1000>= RC>FCC-1250 | 2 | 3 | | 17 | 19 |
| Number of charges starting at FCC-1250>=RC | 2 | 3 | | 20 | 22 |
| Unused | 1 | 1 | | 23 | 23 |
| Maximum lifetime FCC | 2 | 3 | mAh | 24 | 26 |
| Minimum lifetime FCC | 2 | 3 | mAh | 27 | 29 |
| Maximum lifetime load test voltage | 2 | 3 | mV | 30 | 32 |
| Minimum lifetime load test voltage | 2 | 3 | mV | 33 | 35 |
| Maximum lifetime load test current | 2 | 3 | 0.01 A | 36 | 38 |
| Minimum lifetime load test current | 2 | 3 | 0.01 A | 39 | 41 |
| Maximum lifetime load test power | 2 | 3 | Watt | 42 | 44 |
| Minimum lifetime load test power | 2 | 3 | Watt | 45 | 47 |
| Maximum lifetime peak charge temperature | 2 | 3 | 0.1 Kelvin | 48 | 50 |
| Maximum lifetime peak charge sensor Identification | 1 | 2 | | 51 | 52 |
| Minimum lifetime peak charge temperature | 2 | 3 | 0.1 Kelvin | 53 | 55 |
| Minimum lifetime peak charge temperature sensor Identification | 1 | 2 | | 56 | 57 |
| Maximum lifetime peak discharge temperature | 2 | 3 | 0.1 Kelvin | 58 | 60 |
| Maximum lifetime peak discharge temperature sensor Identification | 2 | 3 | | 61 | 63 |
| Lifetime low power count | 1 | 2 | | 64 | 65 |
| Lifetime full charge cycle count | 2 | 3 | | 66 | 68 |
| Lifetime condition cycle count | 2 | 3 | | 69 | 71 |
| Lifetime wakeup count | 1 | 2 | | 72 | 73 |
| Lifetime reset count | 1 | 2 | | 74 | 75 |
| Lifetime total fault count | 2 | 3 | | 76 | 78 |
| Lifetime cell under-voltage count | 1 | 2 | | 79 | 80 |
| Lifetime over-current fault count | 1 | 2 | | 81 | 82 |
| Last condition cycle time | 4 | 5 | sec | 83 | 87 |
| Charge cycle count during last condition cycle | 2 | 3 | | 88 | 90 |

Abbreviations used in the Table 1 are identified as follows: CRC means cyclic redundancy check; FCC means full charge capacity; RC means remaining capacity.

Referring to Table 1 above, the clock field may be updated whenever the battery's runtime archive is changed. In case the battery loses power completely, the battery can use this field to reset its clock to the latest recorded time. This ensures that the timestamp in all history records stored in the memory increases with time, even after a power loss, to facilitate reassembly of the complete history data downloaded from the battery memory. Although it is not possible to account for the time lapse during a power loss, the time lapse may be estimated from the gap in the timestamps of individual history records. The clock field may also be updated using data received from global position satellites, in those embodiments where a GPS receiver, or other similar technology, such as location technology based on cellular telephone technology, is included in the battery.

In one embodiment, the data and information stored in the battery, besides being related or representative of data related to the long term operation of the battery and are not date sensitive, may also be related to run-time events that are recorded as they occur. For example, data or information related to an actual use of the battery may be recorded.

In another embodiment of the present invention, the data and information stored in the battery may include data related to the current operation of the battery. Such data and information is commonly referred to as "run time" information or data.

Table 2 is an exemplary listing of data or information related to the current operation, or run time, history of the battery that may sense or collected by pack controller 800 during the lifetime of the battery and then stored in the event archive 900. It will be understood that while certain fields are shown, other data fields may be used, depending only on the design requirements of the system.

TABLE 2

| Event | ID | Parameters/Units | Total Parameter Length (bytes) |
|---|---|---|---|
| Battery heart beat | 0 | none | 0 |
| Error | 1 | error code | 2+ |
| Powered device operation power drain | 2 | current @ max power, 0.01 A voltage @ max power, mV Max battery temp, 0.1 K RC, mAh | 8 |
| Mode change | 3 | Mode voltage, mV RC, mAh ARC, mAh | 7 |
| Battery state at start of charge | 4 | FCC, mAh RC, mAh voltage, mV charge cycle type | 7 |
| Battery state at end of charge | 5 | FCC, mAh RC, mAh voltage, mV Peak Temp, 0.1 K Peak Temp ID | 9 |
| Load test result | 6 | voltage, mV current, 0.01 A BCP rev # test result | 7 |
| BCP update | 7 | old BCP rev # new BCP rev # | 4 |
| Initialization complete | 8 | minor software revision major software revision | 2 |

The run time information and data stored in the EEPROM 900 may be stored in a predetermined format. Once example of such a format, used to store the data listed in Table 2, is shown in Table 3 below:

TABLE 3

| Byte/Unit | 1-4 | 5 | 6 | 7-15 | 16 |
|---|---|---|---|---|---|
| Data field | Timestamp, sec | Event ID | Parameters total length, byte | Parameter(s) | CRC |

In this exemplary embodiment, a data record 16 bytes long is constructed using the data and information listed in Table 2. Additionally, the record includes a timestamp, stored in seconds, for each recorded event.

Referring again to Table 2, when an "error" event is detected, the parameter stored in the data record is a 2 byte long error code. Such a code may be useful when the data is analyzed in troubleshooting the error in operation of the battery or the device being powered and determining any correction that needs to be made to prevent the error from occurring in the future. Additional data may be included as needed depending on the fault detected.

The error code may also be the result of a self-test performed on the battery systems by the battery management system pack controller 800, or one of the other processors resident in the battery management system. Such a self-test may be initiated either automatically, such as in the event of a detected problem, or according to a predetermined schedule, or in response to a command from a user.

Various testing is done during the self-test. For example, the processor may test the various functions of the components of the battery management system and/or the battery cells to determine if they are functioning within acceptable parameter rangers. In one example, the temperatures sensors measuring the temperature of the battery or of individual battery cells may be polled periodically, such as, for example, every thirty (30) seconds. The results of the self-test may be recorded in EEPROM 900 as described above. Additionally, the pack controller 800 may provide a visual indication of the results of test by sending a signal to the battery charger or device being powered to control an indicator or a display. A visual indication may also be provided by sending a signal to the LEDs of the battery pack. In the event of a failed test, the pack controller 800 may control the n-FETs of the battery management system to open the main bus, effectively turning the battery off. Such a condition may require removal of the battery from the powered device or charger and insertion (or re-insertion) into a battery charger before controller 800 will allow the battery to provide current to a device.

The "powered device operation power drain" event is recorded while the device to be powered is in active operation. Using this parameter, the battery monitors the power and writes the current, voltage and temperature associated with the peak power provided by the battery, along with the remaining charge in the battery, as determined by the gas gauge, to the archive in 5-minute intervals. Each of these parameters requires two bytes of the data record, for a total of eight bytes.

The "mode change" event provides a record of each time the operating mode of the battery is changed, along with the battery voltage and remaining charge available at that time. For example, the Mode parameter requires one byte, with the following modes defined as 0=Not in device, 1=In Device, and 2=Low power. "Low power" mode occurs when the pack controller 800 disables the battery because the power remaining in the battery has fallen to an extremely low level. The battery also enters this mode when the pack controller 800 wakes up after losing power, most likely during a wakeup charge. Once the battery has enough charge to resume normal operation, controller 800 provides a signal indicating that the battery is now in the "In Device" mode. The battery voltage, remaining capacity and adjusted remaining capacity of the battery as determined by the gas gauge each require two bytes, for a total of seven bytes for this event. The adjusted remaining capacity is adjusted for scale, offset and time the battery has been inactive.

The "battery state at start of charge" event requires seven bytes and is written when charging of the battery is initiated. The type of charge cycle initiated is recorded in one byte, where 0=normal cycle and 1=condition cycle. A condition cycle is initiated when the battery is first charged, or after a deep discharge. The battery voltage at the start of charge, as well as the full charge capacity and remaining charge in the battery, as determined by the gas gauge, each require two bytes for a total of seven bytes. In the event that a wakeup charge is required to resuscitate the battery, the data in this field will be recorded in EEPROM 900 when the battery voltage is sufficient to power up pack controller 800.

The "battery state at end of charge" event is similar to the "battery state at start of charge" event, except that it is the battery voltage, full charge capacity, peak battery temperature, peak temperature ID, and remaining charge that is stored. Both the full charge capacity and remaining charge are acquired from the gas gauge. In the event that charging is interrupted for any reason, such as, for example, the battery is withdrawn from the charger before charging is complete, this event is not written to EEPROM 900. This event requires a total of nine bytes in the data record.

The "load test result" event records the result of a test that is performed on the battery by the charger when the battery is in the charger. The results of the test are recorded in EEPROM 900 by the battery charger over communication line 810. This record includes one byte recording the result of the test, such as, for example, where 0=Fail, 1=Pass, and 2=Pass with an end-of-life warning. The end-of-life warning is an indication that the battery is approaching its service life, and may need to be replaced soon.

The "BCP event" is recorded when a new battery configuration parameter (BCP) is uploaded to the battery. The battery configuration parameter includes fields for revision number and a flag that identifies the direction of data flow; that is, data flowing into, or out of, the battery. In some embodiments, the BCP also includes test criteria for controlling the load test.

If the upload fails verification, the new BCP will not be saved into the memory of the battery, and this event will not be generated, and thus this event will not be stored in the EEPROM 900. This event requires a total of four bytes, with two bytes reserved for the revision number of the old BCP stored in the battery before the upload, and two bytes reserved for storing the revision number of the new BCP that has been uploaded, verified and stored in the memory of the battery.

The "initialization complete" event is recorded upon the completion of the first initialization of the battery to record the version of the software loaded into the battery. This event records whether the software revision is a minor or major revision, and is recorded only once in the battery's lifetime, since a software revision will cause this event to be overwritten with the new software version.

Data identifying the battery, such as a serial number or collection of alpha numeric characters may also be stored in the EEPROM 900, or in other memory associated with the various processors or circuits of the battery management system. This identification information may be useful when the data is retrieved from the memory and analyzed.

As discussed above, in an embodiment of the present invention, the pack controller 800 may be programmed to accept data provided to it through the front side, or smart bus, 810 by either a battery charger, or a device which is being powered by the battery. The device to be powered, for example, the mechanical compression device described above, may have a processor and communication system that can transmit data or information to the battery that is related to the actual use of the mechanical compression device. The battery would then be used as a carrier of the information, which could then be retrieved from the event archive memory when the battery was recharged or serviced.

Figure 7:
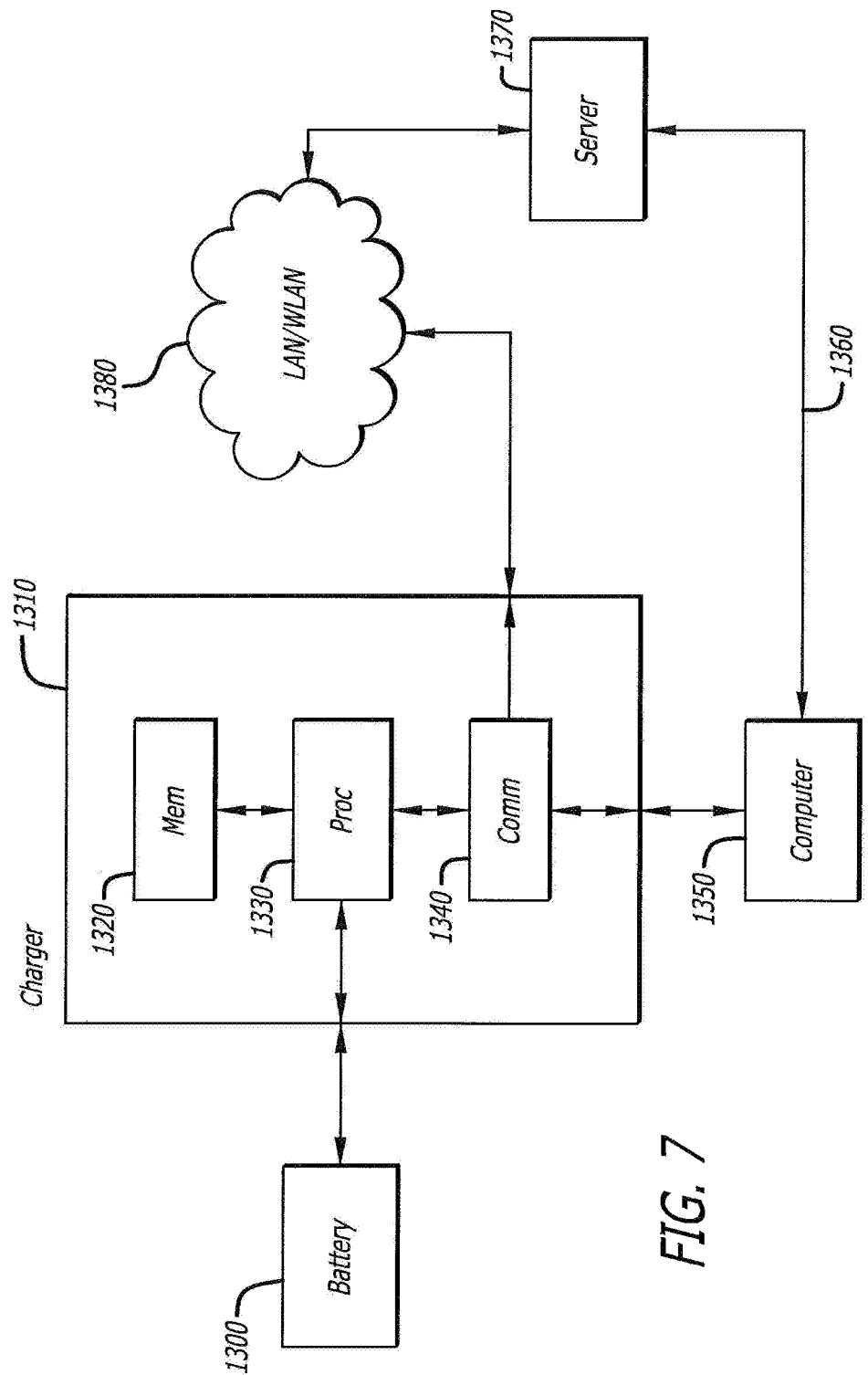
FIG. 7 is a schematic diagram of an embodiment of a system for retrieving information stored in an event archive of the batter in accordance with principles of the present invention.

FIG. 7 is a schematic illustration of one such system. In this illustration, a battery 1300, having data and information stored within an event archive EEPROM memory, is inserted into a charger 1310 for recharging after use. Charger 1310 includes a processor 1330 which is in operable communication with a memory 1320 and a communication circuit or port 1340. When battery 1300 is inserted into the charger, the processor 1330 sends a data retrieval request to the pack controller of the battery to retrieve data and/or information from the event archive memory of the battery. Upon this request, a communication session may be established between the processor 1330 and the pack controller of the battery, wherein the data and/or information stored in the event archive of the battery is communicated to the processor 1330 of the charger. Alternatively, the pack processor 800 controlling the operation of the battery may be programmed to transmit the information to a central server.

The data and/or information communicated to the processor 1330 may be then be stored in memory 1320 of the charger. It will be understood that memory 1320 may be any storage media that is capable of being written to and read by a processor, and may preferably be a non-volatile memory such as flash memory or it may be a storage media such as a hard disk drive.

Alternatively, processor 1330 may also communicate the retrieved data and/or information to a storage device external to the charger, such as a computer 1350 which in turn has its own memory or storage media, using the communication port 1340. In another embodiment, the data and/or information retrieved from the battery may be stored in the memory 1320 of the charger until such time as the charger is commanded to communicate the data and/or information to another computer, server or other system for analysis. In such an embodiment, the charger may be capable of communicating over a wired or wireless network, such as is illustrated by telephone line 1360 using appropriate communication hardware and software using a modem connected to a computer or the charger, to communicate the data and/or information to another system, such as a server 1370 located remotely from the charger 1310. While the invention is discussed in relation to "a server," those skilled in the art will understand that "a server" also includes systems where the server functions are distributed among more than one physical "server" units.

Alternatively, the charger may be capable of communicating through a LAN/WLAN 1380, which may be a local area network, a wide area network, the Internet and the like to communicate the data and/or information retrieved from the battery to server 1370. Such a communication process may be carried out through a wired system, or with the addition of appropriate hardware to the charger, such as a network card, wireless modem and the like, may be accomplished wirelessly.

Viral Distribution

Figure 8:
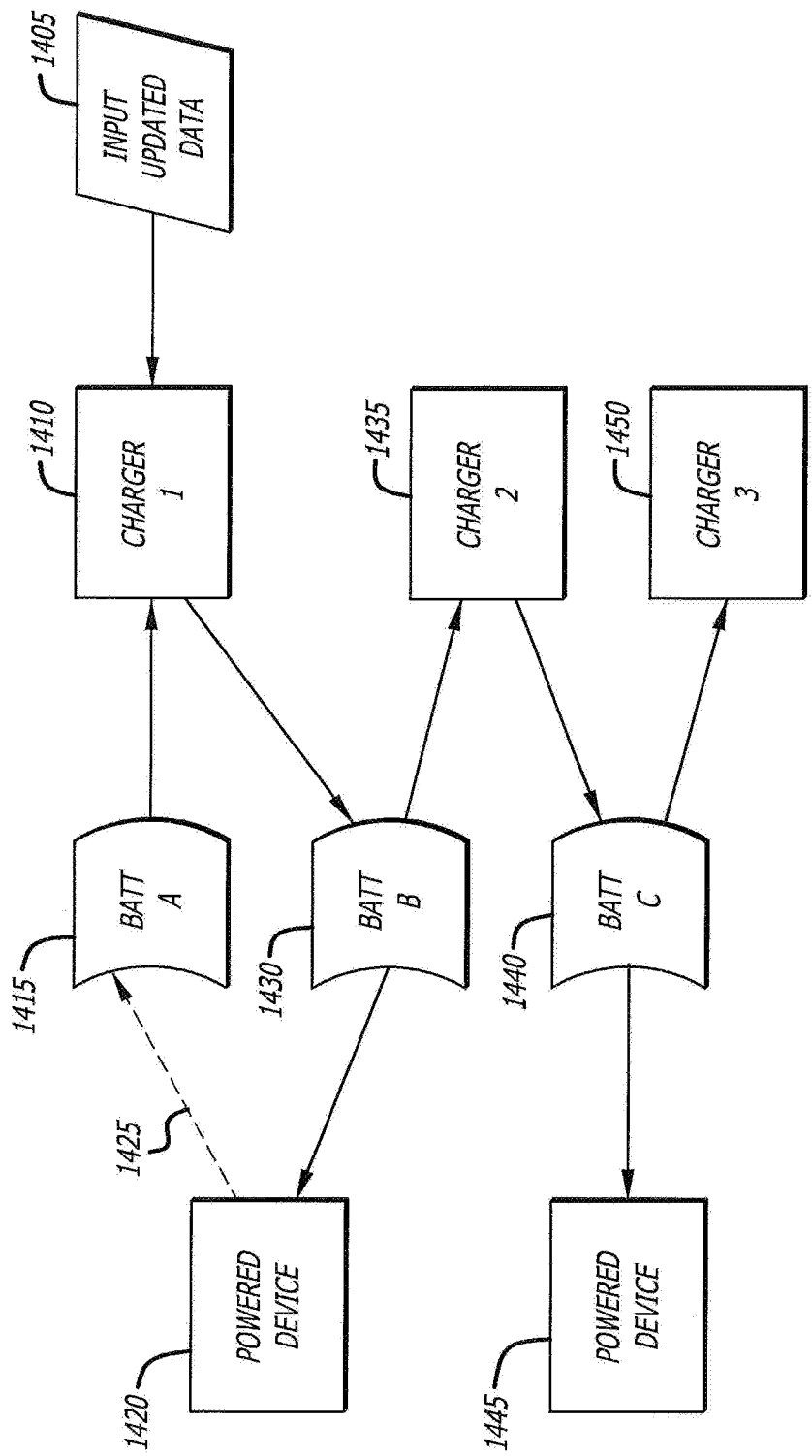
FIG. 8 is a schematic representation of the viral transmission of data, information and/or software programs or commands using an embodiment of the battery of the present invention as a carrier.

FIG. 8 illustrates yet another embodiment of the present invention wherein the battery archive memory is used to facilitate distribution of updated data, information, operating parameters and software that is used by the processors of the battery management system to monitor and control the operation of the battery during the battery's lifetime.

Referring again to FIG. 6, battery pack 300 includes various processors and controllers, such as, for example, pack controller 800, primary protection circuit 410, IC 510 and memories such as EEPROM 1000, EEPROM 900 and EEPROM 620, among others. The processors are configured to control the operation of the battery, and the memories are configured to store, among other data and information, operating parameters used to control the operation of the battery and/or software programming that is used to program and control the processor to carry out the tasks required by the designers of the software. Additionally, the memories may store information related to or associated with the operating parameters and/or software, such as, for example, a version number associated with a particular version of the parameters or software, or the memories may also be used to accumulate and store data related to the usage of the battery or equipment, performance characteristics or system configuration of the battery, charger or equipment powered by the battery, and maintenance data related to the operation of the battery, charger or equipment powered by the battery.

The data stored and transferred by the battery to and from the charger or equipment powered by the battery may also include historical information related to individual batteries or pieces of equipment that the battery has been in communication with, where the data includes an identifier that allows the data to be analyzed to determine the operational history and/or performance of the individual battery, charger or piece of equipment. In some embodiments, the data may also include location data identifying the location of the charger or equipment to facilitate location of the charger and device in the event there is a need to locate the charger or equipment.

Examples of equipment powered by batteries that may benefit from the various embodiments of the present invention include, but are not limited to, battery powered medical devices, defibrillators, mechanical compression equipment, and any other equipment that is not typically connected to either a wired or wireless communication network yet still require to be tracked and/or updated on a periodic basis to ensure that the devices or equipment are operating with the most up to date data, configuration information, performance specifications, operating parameters and software programming available.

One common element in a system using rechargeable batteries to power equipment is that the batteries need to be recharged. Often, to save weight in the equipment using the battery, if the equipment is designed for portability, the batteries are removable from the equipment so that they may be charged outside of the equipment. Thus, the portable equipment is not required to include battery charging circuitry.

The batteries are typically inserted into a dedicated battery charger for recharging. In one embodiment of the present invention, the charger includes a processor and a memory. The processor is controlled by software commands that may be imbedded in the processor, or they may be stored in a memory and retrieved from the memory by the processor as needed. Such programming and control schemes are well known to those skilled in the art, and will not be described in detail herein.

Utilizing various embodiments of the present invention, a battery may have an updated revision of operating parameters or software commands stored within the memory of the battery. When the "updated" battery is inserted into a charger, the processor of the battery, the charger, or both, check the version of the operating parameters or software in the memory of the battery with the version that is present in the memory of the charger. If the version on the battery is later than the version stored in the memory of the charger, the memory of the charger is updated with the updated version of the operating parameters and/or software present on the battery.

Alternatively, if the version of the operating parameters and/or software present in the memory of the charger is later than the version stored in the memory of the battery, the latter version of the operating parameters and/or software stored in the charger is downloaded into the battery. In this manner updated versions of the operating parameters and/or software programs can be propagated across a fleet of batteries used to power equipment.

In another embodiment of the invention, a battery can be used as a carrier to distribute or retrieve data generated during usage of the battery and/or equipment. Such data may include, for example and without limitation, historical operational data, maintenance data and the like.

In still other embodiments, one or more of the chargers or pieces of equipment powered by the battery may be in communication with a centralized network or server through a communication system such as the internet or other wired or wireless network or communication line. In this way, updated data, operating parameters, configuration information and software programs may be pushed out to the one or more chargers and/or pieces of equipment in communication with the network or server by, for example, a processor on the network or server suitably configured by appropriate software. Alternatively, the one or more chargers or pieces of equipment may periodically query the network or server to determine if there are updated data, operating parameters, configuration information and software programs present on the network or server that need to be downloaded from the network or server to the charger or piece of equipment, and if so, accept the updated data, operating parameters, configuration information and software programs from the network or server and store them in the memory of the charger or piece of equipment. When a battery is next inserted into the charger or piece of equipment having the updated data, operating parameters, configuration information and software programs stored in its memory, the updated data, operating parameters, configuration information and software programs is downloaded into the memory of the battery. When the battery is next inserted into a charger or piece of equipment that does not have the updated data, operating parameters, configuration information and software programs in its memory, the battery then uploads the updated data, operating parameters, configuration information and software programs to the memory of the charger or piece of equipment, thus facilitating the rapid distribution of the updated data, operating parameters, configuration information and software programs throughout the user base of chargers and pieces of equipment powered by the battery.

FIG. 8 is a schematic illustration of the use of a battery in accordance with various embodiments of the invention as a carrier. Updated data, information, or software programming (hereinafter, collectively, "data") 1405 is communicated to a charger 1410. Data 1405 may be communicated to charger 1410 by a computer in communication with charger 1405.

Alternatively, charger 1410 may be connected to a network, server, or other source of data.

In an alternative embodiment, battery A 1415 may contain the data 1405, and communicate the data 1405 to charger 1410 when battery A 1415 is inserted into charger 1410 for recharging. In this embodiment, updated data 1405 may have been stored in the memory of the battery by a processor in powered device 1420 when battery 1415 was inserted into the powered device, as illustrated by broken line 1425.

Once the data 1405 has been transferred to a memory of charger 1410, the next battery to be inserted into charger 1410, in this case, battery B 1430, may become a carrier for data 1405 if the memory of battery 1430 does not already contain data 1405. Assuming that the data 1405 is a later version of earlier data residing in the memory of battery B 1430, the processor of the battery, such as pack controller 800, will control the download of the data 1405 from charger 1410 to the memory of battery B 1430.

When battery B 1430 is inserted into powered device 1420, the processors of device 1420 and battery B 1430 communicate to determine if the data stored in the memory of device 1420 is an earlier or later version of the data stored in the memory of battery B 1430. If the data stored in the memory of device 1420 is an earlier version, then the data 1405 is uploaded from the memory of battery B 1430 to the device 1420. If the data stored in the memory of device 1420 is a later version than data 1405, then the processors may decide either to download the later version of data to battery B 1430, replacing data 1405 with the later version for further transmission other devices, chargers and batteries, or the processes may decide that no transfer is to take place, and data 1405 is not uploaded into device 1420.

Assuming that battery B 1430 has the latest version of data 1405 stored within its memory, the next time battery B 1430 is inserted in a charger, such as, for example, charger 1435, the process is repeated, with processor of battery B 1430 communicating with the processor of charger 1435 to determine whether battery B 1430 or charger 1435 has the latest version of the data. Depending on this determination, the data in battery B 1430 is either uploaded into the memory of charger 1435, where it is now available to update the data in other batteries, such as battery C 1440, or a new version of data will be downloaded from charger 1435 into battery B 1430.

Assuming that battery B 1430 has uploaded data 1405 into the memory of the charger 1435, the next battery inserted into charger 1435, here, battery C 1440, may again have the data in its memory updated when it is inserted into charger 1435. Battery C 1440 may then transmit updated data 1405 into powered device 1445 when battery C 1440 is inserted into device 1435

This process continues virally, that is, it spreads the updated data from charger to battery to powered device in an automated fashion that helps to ensure that each battery, charger and powered device are operating using the latest data, information and/or software programming.

The battery may also include circuitry for determining where the battery is located, such as circuitry that can communicate with a global positioning satellite and analyze the position of the battery from those communications using methods well known in the art. Such location information could then be stored in the event archive memory of the battery for later analysis and tracking of the location of the battery.

In another embodiment, the battery may also include an accelerometer that may provide data and information related to the handling of the battery that can be stored in the archive memory of the battery. Such data may be useful in determining the kind and level of forces that the battery experiences during use and transportation, and may be useful in improving the design of the battery to prevent damage during use and transportation to extend the life of the battery. The data gathered from the accelerometer may also be used in real time to detect when the battery or device in which the battery is inserted has been subjected to a shock that may have caused damage to the battery or device to be powered. In this embodiment, the data is processed by the pack controller which may determine that the battery should not be used until the battery pack is checked for damage. Once a diagnostic test is run, the processor may then, assuming the diagnostic test indicates that the battery is capable of operating within normal parameters, permit the battery pack to operate and provide energy to the device to be powered.

In some embodiments, the charger may also exercise and condition the battery to determine whether the battery's performance is within acceptable parameters. The battery charger may also include diagnostic programs which can interface with the battery pack controller to run diagnostic tests on the battery. In some embodiments, the charger may be configured so that the processor of the charger may control the upload and download of updated operating parameters and/or software or hardware programming commands to the pack controller. The pack controller would then store the updated operating parameters in the appropriate memory, such as EEPROM 620 or to update the programming of the primary protection processor 410, the state of charge processor 610 or the pack controller 800 itself.

Communication of data and information stored within the event archive of the battery to an external computer or server for analysis would also be advantageous in that it would enable the establishment of a battery data base. For example, the operation and life of a battery could be indexed by battery serial number, and correlated with data related to the charge using a serial number of the charger. Such a database would be useful in determining long term trends associated with the batteries and chargers as they are used in the field which could then result in the development of improvements to the batteries and chargers. Additionally, as upgrades to the operating parameters and/or software or hardware program commands occur, the battery history data could be correlated with the upgrades to track the operational success or failure of the upgrades.

While several particular forms of the invention have been illustrated and described, it will be apparent that various modifications can be made without departing from the spirit and scope of the invention.

What is claimed is:

1. A system for transporting information related to operation of a device powered by a battery pack including a rechargeable battery, comprising:

the rechargeable battery having a positive and a negative terminal, the battery pack configured to be removably inserted into a battery receiver of a device to be powered by the battery pack; and a memory disposed in a housing of the battery pack, the memory configured to retain data, stored to the memory, related to operation of the rechargeable battery, and receive, from the device powered by the battery pack, historical data related to operation of the device powered by the battery pack, wherein the data related to operation of the rechargeable battery is associated with a battery identifier, and the historical data related to operation of the device powered by the battery pack is associated with a device identifier; and
a processor remote from the battery pack and configured to
communicate with the battery pack, and
retrieve at least the historical data related to the operation of the device powered by the battery pack from the memory.

2. The system of claim 1, wherein the device to be powered by the battery pack is a chest compression device.

3. The system of claim 1, further comprising a processor of the battery pack, wherein the processor of the battery pack is configured to:
collect the data related to operation of the rechargeable battery; and
responsive to a request by the processor remote from the battery pack, the processer being a processor of a battery charger, communicate the data related to operation of the rechargeable battery and the historical data to the battery charger for storage in a memory of the battery charger.

4. The system of claim 3, wherein the processor of the battery charger is configured to communicate the data saved in the memory of the battery charger to a network server or computer remote from the battery charger.

5. The system of claim 1, wherein the memory is configured to maintain the historical data in an event archive.

6. The system of claim 1, wherein the processor is configured to store at least one of information related to an identity of the battery pack, information related to a component of the battery pack, or data related to an operation of the rechargeable battery in the memory disposed in the housing of the battery pack.

7. The system of claim 6, wherein the data related to the operation of the rechargeable battery includes data selected from the group consisting of number of times the battery has been charged or discharged, a maximum or minimum lifetime load test voltage, a maximum or minimum lifetime load test current, a maximum or minimum lifetime load test power, a maximum lifetime peak charge temperature, a temperature sensor ID, a minimum lifetime peak charge temperature, a maximum lifetime peak discharge temperature, a lifetime full charge cycle count, a lifetime condition cycle count, a lifetime low power count, a lifetime wakeup count, a lifetime reset count, a lifetime total fault count, a lifetime cell under-voltage fault count, a lifetime overcurrent fault count, and a last condition cycle time.

* * * * *